(12) United States Patent
Hedayat

(10) Patent No.: US 10,321,403 B2
(45) Date of Patent: Jun. 11, 2019

(54) IMPLICIT SOUNDING FOR OFDMA OPERATION

(71) Applicant: NEWRACOM, INC., Irvine, CA (US)

(72) Inventor: Ahmad Reza Hedayat, Aliso Viejo, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 15/881,600

(22) Filed: Jan. 26, 2018

(65) Prior Publication Data
US 2018/0152935 A1 May 31, 2018

Related U.S. Application Data

(63) Continuation of application No. 15/007,020, filed on Jan. 26, 2016, now Pat. No. 9,883,490.
(Continued)

(51) Int. Cl.
G08C 17/00 (2006.01)
H04W 52/02 (2009.01)
(Continued)

(52) U.S. Cl.
CPC ....... H04W 52/0235 (2013.01); H04L 5/0007 (2013.01); H04L 5/0057 (2013.01); H04L 5/0091 (2013.01); H04W 52/0216 (2013.01); H04W 52/0219 (2013.01); H04W 72/0453 (2013.01); H04W 72/085 (2013.01); H04W 84/12 (2013.01); Y02D 70/00 (2018.01); Y02D 70/10 (2018.01); Y02D 70/14 (2018.01); Y02D 70/142 (2018.01); Y02D 70/22 (2018.01)

(58) Field of Classification Search
None
See application file for complete search history.

(56) References Cited

U.S. PATENT DOCUMENTS

2010/0260138 A1* 10/2010 Liu ............... H04L 5/0023
370/330
2011/0019715 A1* 1/2011 Brisebois ............ H04B 7/0626
375/130
(Continued)

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.
(Continued)

Primary Examiner — Phirin Sam

(57) ABSTRACT

A method for communication in a wireless local area network comprises receiving, at a first device, a control frame from a second device. The method further comprises determining, by the first device using the control frame, a channel state information (CSI) for each of a plurality of sub bands of a bandwidth of the control frame, and allocating, by the first device to the second device, one or more sub bands from the plurality of sub bands based on the determination, the one or more sub bands to be allocated to the second device for transmitting data to the second device from the first device via an Orthogonal Frequency Division Multiple Access (OFDMA) frame.

20 Claims, 8 Drawing Sheets

Related U.S. Application Data

(60) Provisional application No. 62/107,963, filed on Jan. 26, 2015, provisional application No. 62/112,095, filed on Feb. 4, 2015.

(51) Int. Cl.
   *H04W 72/04*   (2009.01)
   *H04L 5/00*    (2006.01)
   *H04W 84/12*       (2009.01)
   *H04W 72/08*       (2009.01)

(56) References Cited

U.S. PATENT DOCUMENTS

| | | | |
|---|---|---|---|
| 2012/0147773 A1* | 6/2012 | Kim | H04L 1/0025 370/252 |
| 2015/0016295 A1* | 1/2015 | Ebrahimi Tazeh Mahalleh | H04L 5/0057 370/252 |
| 2015/0017989 A1* | 1/2015 | Brisebois | H04B 7/0626 455/436 |
| 2015/0085693 A1* | 3/2015 | Dinan | H04L 5/0057 370/252 |
| 2015/0215061 A1* | 7/2015 | Tsai | H04J 11/0053 370/328 |
| 2015/0223161 A1* | 8/2015 | Xiao | H04B 7/0417 370/329 |
| 2015/0271829 A1* | 9/2015 | Amini | H04W 24/02 370/329 |
| 2015/0327108 A1* | 11/2015 | Dinan | H04L 5/0057 370/252 |
| 2016/0021661 A1* | 1/2016 | Yerramalli | H04W 16/14 370/329 |
| 2016/0127936 A1* | 5/2016 | Chatterjee | H04B 7/0626 370/252 |
| 2016/0127952 A1* | 5/2016 | You | H04W 28/20 370/252 |
| 2016/0165607 A1* | 6/2016 | Hedayat | H04W 72/0453 370/338 |
| 2016/0242048 A1* | 8/2016 | Pelletier | H04W 72/085 |
| 2017/0163367 A1* | 6/2017 | Tsai | H04J 11/0053 |
| 2017/0181153 A1* | 6/2017 | Choi | H04W 72/048 |
| 2017/0188350 A1* | 6/2017 | Kim | H04B 17/309 |
| 2017/0201996 A1* | 7/2017 | Brisebois | H04B 7/0626 |
| 2017/0238286 A1* | 8/2017 | Chun | H04L 1/00 370/329 |
| 2017/0257198 A1* | 9/2017 | Wilhelmsson | H04L 5/0037 |
| 2017/0288794 A1* | 10/2017 | Yerramalli | H04W 16/14 |
| 2018/0213443 A1* | 7/2018 | You | H04W 28/20 |
| 2018/0376359 A9* | 12/2018 | Kim | H04L 5/0053 |

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

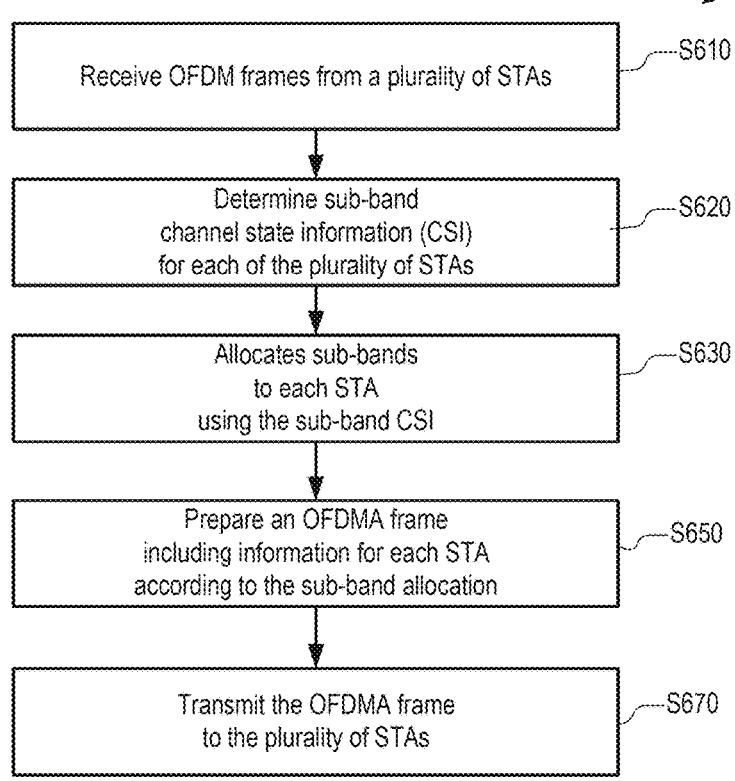
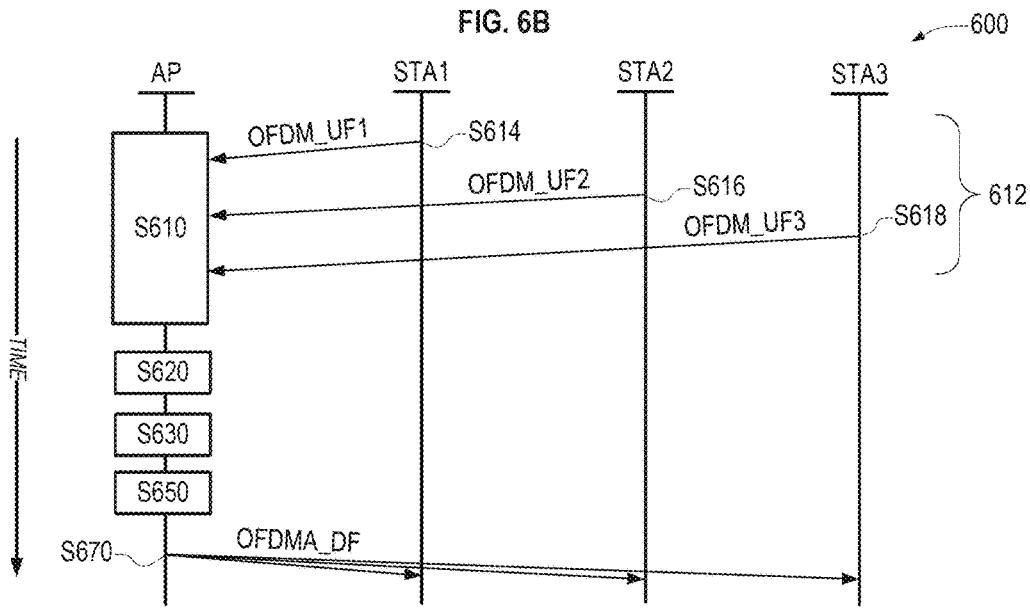

IMPLICIT SOUNDING FOR OFDMA OPERATION

CROSS-REFERENCE TO RELATED APPLICATION

This application is a continuation of U.S. patent application Ser. No. 15/007,020, filed on Jan. 26, 2016, now U.S. Pat. No. 9,883,490, to issue on Jan. 30, 2018, which claims priority to and the benefit of U.S. Provisional Application 62/107,963, filed on Jan. 26, 2015 and U.S. Provisional Application 62/112,095, filed on Feb. 4, 2015, the entire respective contents of which are incorporated herein by reference.

BACKGROUND

1. Technical Field

The technology described herein relates generally to wireless networking. More particularly, the technology relates generally to allocating frequency resources to each of a plurality of stations (STAs) in a Wireless Local Area Network (WLAN).

2. Description of the Related Art

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012). The IEEE Std 802.11™-2012 was subsequently amended by IEEE Std 802.11ae™-2012, IEEE Std 802.11aa™-2012, IEEE Std 802.11ad™-2012, and IEEE Std 802.11ac™-2013. These standards are each hereby incorporated by reference herein in their entirety.

Recently, a high efficiency WLAN for enhancing system throughput in high-density scenarios is being developed by the IEEE 802.11ax task group. In such WLAN scenarios, a transmitting device may transmit an Orthogonal Frequency Division Multiple Access (OFDMA) frame having respective data for each of a plurality of receiving devices. Within the OFDMA frame, the respective data for the receiving devices may be transmitted in one or more frequency regions (sub-bands) respectively allocated to the receiving devices. Each sub-band includes a plurality of subcarriers at different frequencies.

The respective channels between the transmitting device and each of the receiving devices may be frequency selective, which means the channel magnitude changes over frequency. In the design of an OFDMA wireless network, it is possible to take advantage of the frequency selectivity of the channel. For instance, the transmitting device can schedule downlink (DL) transmission for several receiving devices within a downlink OFDMA PHY Protocol Data Unit (PPDU), where the information related to each receiving device is placed in the sub-band wherein the receiving device experiences higher channel magnitude.

The sub-bands that have a high channel magnitude for each receiving device may be determined in order to use resource units or sub-bands optimally. A process of determining the sub-bands that have a high channel magnitude for each receiving device may require the transmission of additional frames and may thereby cause a deterioration in an efficiency, a throughput, or of both on the WLAN. Reducing or eliminating that deterioration may be desirable.

SUMMARY

A method for communication in a wireless local area network comprises receiving, at a first device, a control frame from a second device, determining, by the first device using the control frame, a channel state information (CSI) for each of a plurality of sub bands of a bandwidth of the control frame, and allocating, by the first device to the second device, one or more sub bands from the plurality of sub bands based on the determination, the one or more sub bands to be allocated to the second device for transmitting data to the second device from the first device via an Orthogonal Frequency Division Multiple Access (OFDMA) frame.

In an embodiment, the first bandwidth is one of a 40 MHz, an 80 MHz, an 80+80 MHz, and a 160 MHz bandwidth. The control frame may be an Orthogonal Frequency Division Multiplexing (OFDM) frame.

In an embodiment, the control frame is an acknowledgement (ACK) frame or a block acknowledgement (BA) frame.

In an embodiment, the method further comprises transmitting to the second device by the first device a downlink (DL) frame prior to the first device receiving the ACK or BA frame. The first bandwidth is a widest allowed bandwidth between the first device and the second device. The widest allowed bandwidth is a widest continuous bandwidth that is available for communications between the second device and the first device.

In an embodiment, the DL frame may include a block acknowledgement request (BAR) frame.

In an embodiment, the transmitting of the DL frame is by transmitting the DL frame using a second bandwidth, the second bandwidth being greater than 20 MHz, where the first bandwidth is a widest bandwidth that is equal to or less than the second bandwidth and that is determined to be available use by the second device.

In an embodiment, the DL frame includes a bandwidth indicator that indicates the second bandwidth.

In an embodiment, the control frame is a power save (PS) poll frame.

A system for communication in a basic service set (BSS) comprises a radio frequency (RF) transceiver, one or more processors, and a non-transitory computer readable medium The non-transitory computer readable medium comprising computer executable instructions which, when executed by the one or more processors, causes the system to receive a control frame from a station, determine a channel strength for each of a plurality of sub bands associated with a bandwidth of the control frame, allocate to the station one or more sub bands from the plurality of sub bands based, at least in part, on the determination, the one or more sub bands to be allocated to the station for transmitting data to the station; and transmit the data using the one or more allocated sub bands and via an Orthogonal Frequency Division Multiple Access (OFDMA) frame.

In an embodiment, the control frame is an Orthogonal Frequency Division Multiplexing (OFDM) frame and the bandwidth is one of a 40 MHz, an 80 MHz, an 80+80 MHz, and a 160 MHz bandwidth.

In an embodiment, the control frame is an acknowledgement (ACK) frame, a block acknowledgement (BA) frame, or a power save (PS) poll frame.

A method for communication between devices in a wireless network comprises determining, by a first device, a widest allowed bandwidth for transmitting a control frame to a second device, transmitting, by the first device, the control frame to the second device using the widest allowed bandwidth, including using a plurality of sub bands of the widest allowed bandwidth to transmit the control frame, and receiving, by the first device, data from the second device via an Orthogonal Frequency Division Multiple Access (OFDMA) frame and using one or more sub bands selected from the plurality of sub-bands, the one or more sub-bands having been selected based on channel strength information (CSI) determinations made for each of the plurality of sub bands.

In an embodiment, the widest allowed bandwidth is a widest continuous bandwidth that is available for communications between the second device and the first device.

In an embodiment, the control frame is an Orthogonal Frequency Division Multiplexing (OFDM) frame having a bandwidth greater than 20 MHz.

In an embodiment, the control frame is a power save (PS) Poll frame, and the determining the widest allowed bandwidth includes determining whether one or more of a secondary 80 MHz channel, a secondary 40 MHz channel, and a secondary 20 channel is sensed busy during Point Coordination Function Interframe Space (PIFS) time before transmission of the PS-Poll frame, wherein the determination is made when the second device indicates that the second device permits transmission by the first device of the control frame using the widest allowed bandwidth In an embodiment, the control frame is an acknowledgement (ACK) frame or a block ACK (BA) frame, and the widest allowed bandwidth is determined based on a downlink (DL) frame received from the access point.

In an embodiment, the determining of the widest allowed bandwidth includes determining a bandwidth of the DL frame.

In an embodiment, the determining of the widest allowed bandwidth includes sensing an explicit bandwidth indicator included in the DL frame.

BRIEF DESCRIPTION OF THE DRAWINGS

FIG. 6A illustrates a process for communicating using an OFDMA frame according to an embodiment.

FIG. 6B illustrates a process for communicating using an OFDMA frame according to an embodiment.

DETAILED DESCRIPTION

Figure 1:
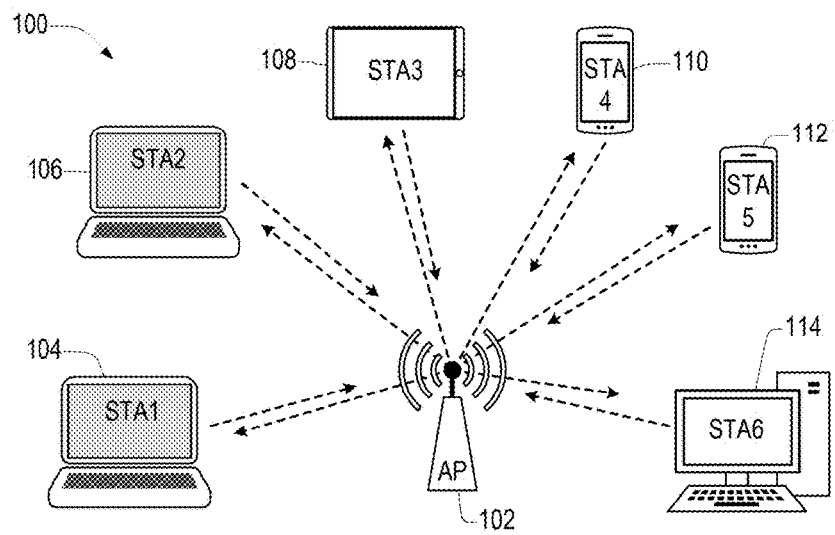
FIG. 1 illustrates a wireless network according to an embodiment.

In the following detailed description, certain illustrative embodiments have been illustrated and described. As those skilled in the art would realize, the described embodiments may be modified in various different ways without departing from the spirit or scope of the present disclosure. Accordingly, the drawings and description are to be regarded as illustrative in nature and not restrictive. Like reference numerals designate like elements throughout the specification.

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an access point (AP) and one or more associated stations (STAs). In FIG. 1, the BSS 100 includes an access point 102 wirelessly communicating with a plurality of wireless devices (or stations) 104 to 114 (also referred to as AP and STA1 to STA6). The wireless devices may include a medium access control layer (MAC) and a physical layer (PHY) according to an Institute of Electrical and Electronics Engineers (IEEE) 802.11 standard.

The AP 102 is a station, that is, a STA configured to control and coordinate functions of the BSS 100. The AP 102 may transmit information to a single station selected from the plurality of stations STA1 to STA6 in the BSS 100 using a single frame, or may simultaneously transmit information to two or more (e.g., to all six) stations STA1 to STA6 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA6 may transmit data to the AP 102 using a single frame, or transmit information to and receive information from another one of the stations STA1 to STA6 using a single frame.

In another embodiment, the AP 102 may be absent and the stations STA1 to STA6 may be in an ad-hoc network.

Each of the stations STA1 to STA6 and the AP 102 includes a processor and a transceiver, and may further include a user interface and a display device. The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network. The transceiver may be defined using a single component that performs the functions of transmitting and receiving, or two separate components each performing one of such functions. The processor and the transceiver may be implemented by respective hardware components, software components, or both that are integrated within each of the respective STA1 to STA6 and the AP 102.

AP 102 may be or may include a WLAN router, a stand-alone Access Point, a WLAN bridge, a Light-Weight Access Point (LWAP) managed by a WLAN controller, and the like. In addition, a station such as a personal computer or cellular phone may be able to operate as the AP 102, such as when a cellular phone is configured to operate as a wireless "hot spot."

Each of STA1 to STA6 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to a higher layer of the communication protocol stack.

Each frame's type and subtype may be identified using a type field and a subtype field included in a control field of the frame, as prescribed in the applicable standard.

Figure 2:
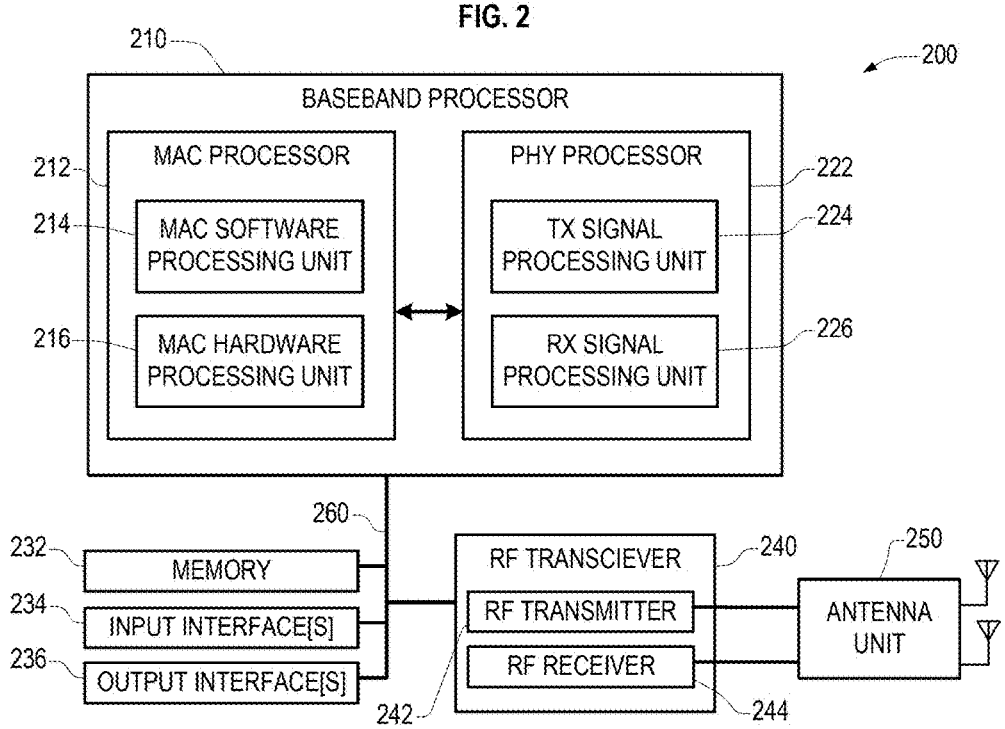
FIG. 2 illustrates a schematic block diagram of a wireless device according to an embodiment.

FIG. 2 illustrates a schematic block diagram of a wireless device 200 according to an embodiment. The wireless or WLAN device 200 can represent any device in a BSS, e.g., AP 102 or any of stations 104-114 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the one or more input interfaces 234, the one or more output interfaces 236, and the RF transceiver 240 may communicate with each other via a bus 260.

The baseband processor 210 performs baseband signal processing, and includes a MAC processor 212 and a PHY processor 222.

In an embodiment, the MAC processor 212 includes a MAC software processing unit 214 and a MAC hardware processing unit 216. The storage device (or memory) 232 may be a non-transitory computer readable medium that stores software (e.g., computer programing instructions) hereinafter referred to as "MAC software". The MAC software processing unit 214 executes the MAC software to implement a first plurality of functions of the MAC layer. The MAC hardware processing unit 216 may implement a second plurality of functions of the MAC layer in special-purpose hardware, hereinafter referred to as "MAC hardware."

However, the MAC processor 212 is not limited thereto. For example, the MAC processor 212 may be configured to perform the first and second plurality of functions entirely in software or entirely in hardware according to implementation.

The PHY processor 222 includes a transmitting signal processing unit 224 and a receiving signal processing unit 226. The PHY processor 222 implements a plurality of functions of the PHY layer. These functions may be performed in software, hardware, or a combination thereof according to implementation. In an embodiment, the PHY processor 222 may be configured to generate channel state information (CSI) by processing uplink frames received via the RF transceiver 240. In some cases, the uplink frames may be in the form of OFDM frames. In an embodiment, the PHY processor 222 may be configured to implement the various operations to be described herein.

The channel state information (CSI) may include one or more of a Received Signal Strength Indication (RS SI), a Signal to Interference and Noise Ratio (SINR), a Modulation and Coding Scheme (MCS), and a Number of Spatial Streams (NSS). CSI may be generated for one or more of a frequency block, a sub-band within the frequency block, a subcarrier within a frequency block, a receiving antenna, a transmitting antenna, and combinations of a plurality thereof.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas.

The one or more input interfaces 234 receive information from a user, and the one or more output interfaces 236 output information to the user. The one or more input interfaces 234 may include one or more of a keyboard, keypad, mouse, touchscreen, touch screen, microphone, and the like. The one or more output interfaces 236 may include one or more of a display device, touch screen, speaker, and the like.

As described herein, many functions of the WLAN device 200 may be implemented in either hardware or software, and which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3:
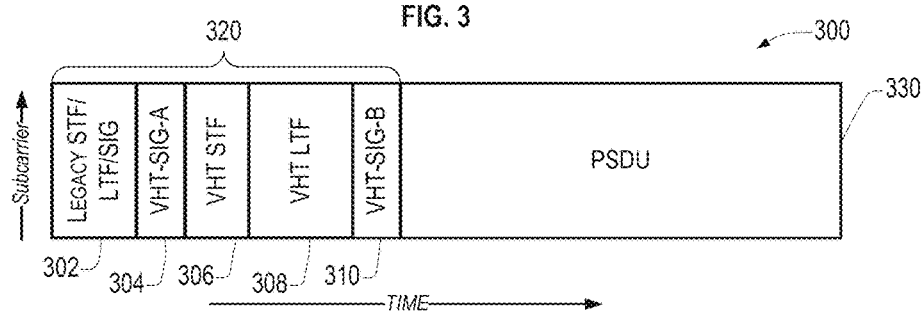
FIG. 3 illustrates an Orthogonal Frequency Division Multiplexing (OFDM) frame that may be employed in an embodiment.

FIG. 3 illustrates an Orthogonal Frequency Division Multiplexing (OFDM) frame 300 according to an embodiment. The OFDM frame 300 includes a PHY header 320 and a Physical Layer Convergence Procedure (PLCP) Service Data Unit (PSDU) 330. The PHY header 320 includes a legacy preamble 302, a Very High Throughput (VHT) first signal (VHT-SIG-A) field 304, a VHT Short Training Field (VHT-STF) 306, a VHT Long Training Field (VHT-LTF) 308, and a VHT second signal (VHT-SIG-B) field 310.

The legacy preamble 302 includes Legacy STF (L-STF) and Legacy LTF (L-LTF) fields that include symbols that are used by a receiving device to identify the start of the OFDM frame 300, synchronize timers, and, in MIMO-capable equipment, select an antenna. The legacy preamble 302 also includes a Legacy Signal (L-SIG) field that includes information from which a legacy receiving device (for example, a device operating according to IEEE Stds 802.11a™-1999, 802.11b™-1999, or 802.11g™-2003) may determine a data rate and a length for the frame.

The VHT-SIG-A field 304 and VHT-SIG-B field 310 include information that the receiver uses to receive the PSDU 312, such as a bandwidth indication, a Space-Time Block Coding (STBC) indication, a Group ID, a partial Association Identifier (AID) field, a Modulation and Coding Scheme (MCS) indication, and so on.

The VHT-STF 306 and VHT-LTF 308 fields include symbols that are used by the receiving device to set receiver gain and to estimate a channel between a transmitter of the OFDM frame 300 and the receiving device, respectively.

The PSDU 330 includes data symbols that are used to transport an aggregate MAC Protocol Data Unit (A-MPDU) including one or more MPDUs. The MPDUs in the PSDU 330 are intended either for a single receiving device when the OFDM frame 300 is not a broadcast frame, or for all the receiving devices in a group when the OFDM frame 300 is a broadcast frame wherein all the receiving devices in the group receive the same information.

As can be seen in FIG. 3, the PSDU 330 of the OFDM frame 300 uses all of the subcarriers used by the PHY header 320. Therefore, in an embodiment, a frame using a 20 MHZ frequency segment includes the PSDU 330 using 56 sub-carriers, a frame using a 40 MHZ frequency segment includes the PSDU 330 using 114 subcarriers, a frame using a 80 MHZ frequency segment includes the PSDU 330 using 242 subcarriers, and a frame using a 160 MHZ frequency segment or two 80 MHz frequency segments includes the PSDU 330 using 484 subcarriers.

Figure 4:
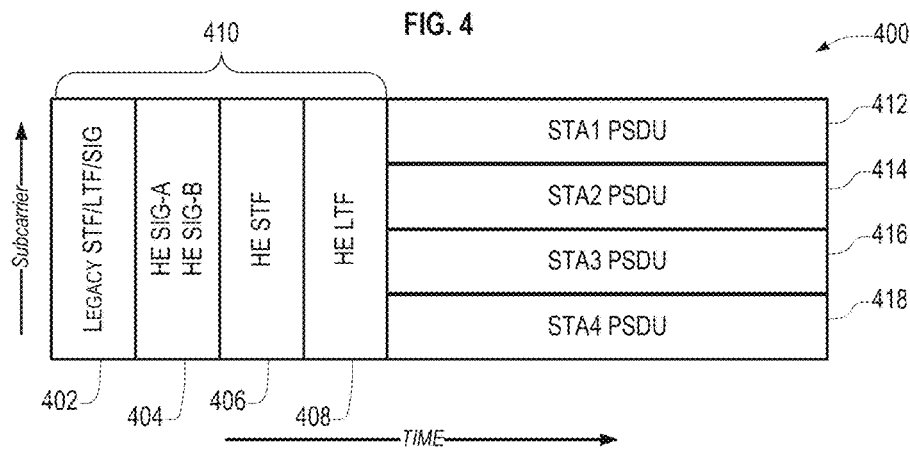
FIG. 4 illustrates an Orthogonal Frequency Division Multiple Access (OFDMA) frame that may be employed in an embodiment.

FIG. 4 illustrates an Orthogonal Frequency Division Multiple Access (OFDMA) frame 400 that may be transmitted, received, or both in an embodiment. The OFDMA frame 400 includes a PHY header 410 and first, second, third, and fourth PSDUs 412, 414, 416, and 418.

The PHY header 410 includes a legacy preamble 402, a High Efficiency (HE) signal portion 404, an HE Short Training Field (HE STF) 406, and an HE Long Training Field (HE LTF) 408. Unlike the PHY header 320, the PHY header 410 includes an indication that the OFDMA frame 410 is an OFDMA frame, or in some embodiments, there would be an indication whether the frame is a single-user (SU) or a multi-user (MU) frame.

The High Efficiency (HE) signal portion 404 includes an HE signal A (HE SIG-A) field, which is transmitted using one or more symbols, and an HE signal B (HE SIG-B) field, which is transmitted using one or more symbols. The HE SIG-A field and HE SIG-B field include information that the receiver uses to receive the first, second, third and fourth PSDUs 412, 414, 416, and 418. In an embodiment, a single HE SIG-A field may be duplicated across a plurality of frequency blocks and may contain information common to all of the first, second, third and fourth PSDUs 412, 414, 416, and 418. In an embodiment, the HE SIG-B field includes a unique sub-field for each of the first, second, third and fourth PSDUs 412, 414, 416, and 418. In an embodiment, the HE SIG-B field may include resource allocation information so that the receiving stations can determine assigned resources in the received PPDU. In an embodiment, the HE SIG-B field may have a variable length.

The HE STF 406 and HE LTF 408 fields include symbols that are used by the receiving device to set receiver gain and to estimate a channel between a transmitter of the OFDMA frame 400 and the receiving device, respectively.

The first, second, third and fourth PSDUs 412, 414, 416, and 418 occupy respective sub-bands within the frequency segment used by the OFDMA frame 400, each sub-band including a contiguous plurality of subcarriers. Each of the first, second, third and fourth PSDUs 412, 414, 416, and 418 includes data symbols that are used to transport A-MPDUs including one or more MPDUs.

The MPDUs in each of the first, second, third and fourth PSDUs 412, 414, 416, and 418 may each be intended for a different receiving device, respectively. FIG. 4 illustrates the first, second, third and fourth PSDUs 412, 414, 416, and 418 that are associated with first through fourth stations STA1 through STA4, respectively. However, embodiments are not limited thereto.

In an embodiment, the OFDMA frame 400 using a 20 MHZ frequency segment may include 9 PSDUs, the OFDMA frame 400 using a 40 MHZ frequency segment may include 18 PSDUs, the OFDMA frame 400 using a 80 MHZ frequency segment may include 36 PSDUs, and the OFDMA frame 400 using a 160 MHZ frequency segment or two 80 MHz frequency segments may include 72 PSDUs.

Figure 5:
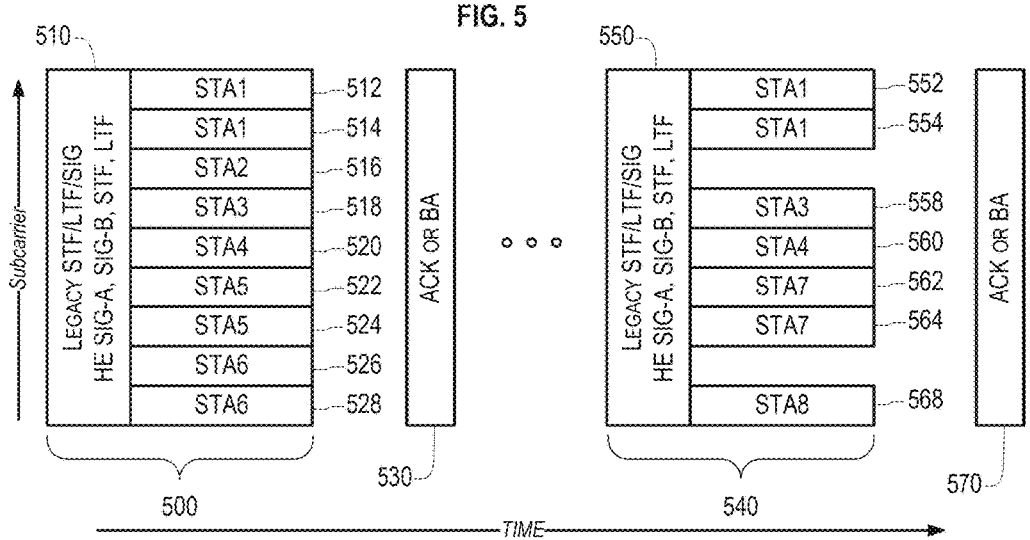
FIG. 5 illustrates a sequence of frames including a plurality of OFDMA frames according to an embodiment.

FIG. 5 illustrates a sequence of frames that may be transmitted by, for example, the AP of FIG. 1 to multiple STAs according to an embodiment, illustrating an association of PSDUs with receiving devices (e.g., the stations STA1 to STA6 of FIG. 1). The sequence of frames includes a first OFDMA frame 500, a first acknowledgement (ACK) frame 530, a second OFDMA frame 540, and a second ACK frame 570. In an embodiment, each of the frames uses a 20 MHz frequency segment, and the first and second OFDMA frames 500 and 540 each include nine sub-bands within the 20 MHz frequency segment (where considering the guard-bands in each side, each sub-channel would be 2 MHz). In an embodiment, the ACK frames 530 and 570 may be a MU ACK frame (with separate PSDUs from each STA), or may be a set of SU ACK frames that are either immediate responses (i.e., the first SU ACK frame) or are responses to polls/BARs from the AP (i.e., every subsequent SU ACK frame after the first immediate response ACK).

The first OFDMA frame 500 includes a PHY header 510 substantially similar to the PHY header 410 of FIG. 4. The first OFDMA frame 500 further includes first through ninth sub-bands 512 through 528, each including a contiguous plurality of subcarriers.

In the first OFDMA frame 500, the first and second sub-bands 512 and 514 are used to transport information to a first station STA1. The third, fourth, and fifth sub-bands 516, 518, and 520 are used to transport data to second, third, and fourth stations STA2, STA3, and STA4, respectively. The sixth and seventh sub-bands 522 and 524 are used to transport information to a fifth station STA5. The eighth and ninth sub-bands 526 and 528 are used to transport information to a sixth station STA6.

The first OFDMA frame 500 is followed by one or more first ACK or Block ACK (BA) frames 530.

In the example of FIG. 5, at some time after the first OFDMA frame 500 is transmitted, the second OFDMA frame 540 is transmitted. Like the first OFDMA frame 500, the second OFDMA frame 540 includes a PHY header 550 substantially similar to the PHY header 410 of FIG. 4 and first through ninth sub-bands 552 through 568, each including a contiguous plurality of subcarriers. The second OFDMA frame 540 may use the same 20 MHz frequency segment that was used by the first OFDMA frame 500.

The allocation of sub-bands to stations in the second OFDMA frame 540 could be different from the allocation of sub-bands to stations in the first OFDMA frame 500. In the second OFDMA frame 540, the first and second sub-bands 552 and 554 are again used to transport information to a first station STA1, and the fourth and fifth sub-bands 558 and 560 are again used to transport data to third and fourth stations STA3 and STA4, respectively.

However, unlike in the first OFDMA frame 500, in the second OFDMA frame 540, the sixth and seventh sub-bands 562 and 564 are used to transport information to a seventh station STAT, the ninth sub-band 568 is used to transport information to an eighth station STAB, and the third and eight sub-bands are not used.

The second OFDMA frame 540 is followed by one or more second ACK or BA frames 570.

FIGS. 6A and 6B illustrate a process 600 for communicating using an OFDMA frame according to an embodiment. In the illustrated example, a BSS (e.g. the BSS 100 of FIG. 1) includes an AP and first, second, and third OFDMA-capable stations STA1, STA2, and STA3. Note that references in the following to an access point (AP) may be in reference to an access point or to any node capable of transmitting OFDMA frames.

At S610, the AP receives OFDM frames from STA1, STA2, and STA3 using bandwidths that are the widest bandwidths available to the stations STA1, STA2, and STA3. In an embodiment, the OFDM frames that may be transmitted by the stations STA1, STA2, and STA3 may be any type of frame that a STA sends as part of its regular functions such as, for example, any one of a power-save (PS) poll frame, an ACK frame, a BA frame, and the like. The sounding process 612 shown in FIG. 6B generally corresponds to S610 of FIG. 6A.

At S620, for each of the stations STA1, STA2, and STA3, the AP determines sub-band channel state information (CSI) indicative of resource unit or sub-band channel conditions for a plurality of RUs or sub-bands of a bandwidth available for OFDMA communication between the AP and the stations STA1, STA2, and STA3. In some cases, a resource unit (RU) may comprise of a set of adjacent/continuous sub-bands and may be an assigned portion of a channel. In an embodiment, the bandwidth is a widest available bandwidth (hereinafter "widest allowed bandwidth") that can be transmitted across the current channel by the AP, received across the current channel by the stations in the BSS, and sensed across the current channel using channel sensing methods, for example, using Clear Channel Assessment (CCA). That is, the widest available or allowable bandwidth is the widest bandwidth that can be used entirely by a first network device to transmit a frame, and to be used entirely by a second network device to receive the frame.

The AP may use one or more fields of the OFDM frames received at S610 to respectively determine the sub-channel CSI, such as, for example, a VHT-LTF symbol or HE-LTF symbol.

In an embodiment, the determination of the CSI for the plurality of sub-bands or RUs between the AP and the stations STA1, STA2, and STA3 may be based on OFDM frames received from the stations STA1, STA2, and STA3 in the sounding process 612 of FIG. 6B. However, embodiments are not limited thereto.

In the sounding process S610, the AP receives first, second, and third frames OFDM_UF1, OFDM_UF2, and OFDM_UF3 to be used for OFDM sub-band sounding for the stations STA1, STA2, and STA3, e.g., from all the stations associated within the BSS. The frames OFDM_UF1, OFDM_UF2, and OFDM_UF3 are OFDM uplink frames in an implementation. The frames OFDM_UF1, OFDM_UF2, and OFDM_UF3 may be transmitted at the widest allowed bandwidths available to stations STA1, STA2, and STA3, respectively.

Although the sounding process 612 involves uplink frames, as will be further described herein, the results of the sounding process 612 may be used to select the sub-carriers or sub-bands or RUs for transmitting DL frames by the AP to the stations STA1, STA2, and STA3 as a result of reciprocity of the channels between the AP and the stations STA1, STA2, and STA3.

In an embodiment, OFDMA sub-band soundings may be performed by the AP using received uplink frames (e.g., the first frame OFDM UF1, the second frame OFDM UF2, and the third frame OFDM_UF3) or other previously received frames transmitted by the stations STA1, STA2, and STA3 when the received frames each include an indication that OFDMA sub-band soundings are to be performed.

In another embodiment, whether OFDMA sub-band soundings may be performed by the AP using the frames OFDM_UF1, OFDM_UF2, and OFDM_UF3 may be determined according to a capability of the respective stations STA1, STA2, and STA3 that broadcast the frame OFDM_UF1, OFDM_UF2, and OFDM_UF3. In an embodiment, the capability of the stations STA1, STA2, and STA3 may be communicated to the AP in a field of frames respectively transmitted by the stations STA1, STA2, and STA3.

In an embodiment, the AP determines respective OFDMA sub-band CSI for each of the stations STA1, STA2, and STA3 using the frames OFDM_UF1, OFDM_UF2, and OFDM_UF3 received from STA1, STA2, and STA3, respectively. Determining the respective OFDMA sub-band CSI for each of the stations STA1, STA2, and STA3 may include determining one or more of RSSI, a SINR, a MCS, and a NSS per a specific resource unit (RU) with a given bandwidth, sub-band or set of sub-bands for each of the transmitting antennas of each of the stations with respect to each of the receiving antennas of the AP. In an embodiment, the AP may determine the OFDMA sub-band CSI using respective LTF symbols (e.g., VHT LTF or HE-LTF symbols) of the frames OFDM_UF1, OFDM_UF2, and OFDM_UF3.

At S614, the first station STA1 transmits a first frame OFDM_UF1 adapted to support implicit OFDMA sounding to the AP. At S616, the second station STA2 transmits a second frame OFDM_UF2 adapted to support implicit OFDMA sounding to the AP. At S616, the third station STA3 transmits a third frame OFDM_UF3 adapted to support implicit OFDMA sounding to the AP.

In an embodiment, each of the first frame OFDM_UF1, the second frame OFDM_UF2, and the third frame OFDM_UF3 may be adapted to support implicit OFDMA sounding by being transmitted from their respective stations STA1, STA2, and STA3 using the widest bandwidths respectively available between the stations STA1, STA2, and STA3 and the AP.

In an embodiment, one or more of the stations STA1, STA2, and STA3 may respectively transmit the first frame OFDM_UF1, the second frame OFDM_UF2, and the third frame OFDM_UF3, unsolicited.

In an embodiment, one or more of the stations STA1, STA2, and STA3 may send the respective frame OFD- M_UF1, OFDM_UF2, and OFDM_UF3 whenever the AP solicits such frames. For example, when the first frame OFDM_UF1 is an ACK or BA frame, the first frame OFDM_UF1 may be transmitted as a response to a data frame or a block acknowledgment request (BAR) previously transmitted to the first station STA1 by the AP1.

In some embodiments, the frames OFDM_UF1, OFDM_UF2, and OFDM_UF3 may be a control frame such as, for example, any one of a PS-poll frame, an ACK frame, a BA frame, and the like.

Returning to FIG. 6A, at S620 the AP determines sub-band channel state information (CSI) corresponding to conditions or states of sub-bands or RUs in the channels between each of the stations STA1, STA2, and STA3 and the AP by processing the uplink frames (i.e., the first frame OFDM_UF1, the second frame OFDM_UF2, and the third frame OFDM_UF3) received from station STA1, station STA2, and station STA3, respectively. In an embodiment, one or more of an RSSI, an SINR, an MCS, and an NSS of the sub-bands or RUs used to transmit the frames OFDM_UF1, OFDM_UF2, and OFDM_UF3 may be determined in order to obtain the CSI for each sub-band or RU between the AP and the stations STA1, STA2, and STA3.

The AP measures one or more characteristics of the respective channel between the AP and the stations STA1, STA2, and STA3 using one or more fields of the respective uplink frame transmitted through the respective channel, such as, for example, an LTF symbol, e.g., VHT-LTF or HE-LTF symbols.

At S630, the AP determines an allocation of sub-bands to the stations STA1, STA2, and STA3 in the BSS according to the sub-band (or RU) CSI respectively determined at S620 for each of the stations STA1, STA2, and STA3.

In an embodiment, allocating sub-bands or RUs to stations includes determining a number of sub-bands or RUs to allocate to each station and assigning sub-bands or RUs to each station until the allocated number of sub-bands or RUs in the channel is assigned to each station. Each sub-band or RU may be assigned to a station, from among the stations having less than the allocated number of sub-bands or RUs currently assigned to them, for which the sub-band or RU has the most suitable CSI, e.g., a highest channel magnitude or among the sub-bands or RUs with highest channel magnitude.

In some embodiments, the AP may be configured to use other processes for allocating sub-bands or RUs to stations according to the sub-band or RU CSI for each station, such as water filling, call admission control, and the like.

At S650, the AP prepares an OFDMA frame OFDMA_DF including first, second, and third information intended for delivery to the first, second, and third stations STA1, STA2, and STA3, respectively. The first to third information may include data from buffers within the AP, each buffer being respectively associated with an intended station of the first to third stations STA1 to STA3. The first information is disposed in one or more sub-bands or RUs assigned to the first station STA1, the second information is disposed in one or more sub-bands assigned to the second station STA2, and so on.

At S670, the AP transmits the OFDMA frame OFDMA_DF to the stations STA1, STA2, and STA3 according to the sub-band or RU allocation performed in S630.

Although not illustrated in FIGS. 6A and 6B, in some embodiments, the frames OFDM_UF1, OFDM_UF2, and OFDM_UF3 used in the sounding process S610 may have been transmitted in response to one more frames transmitted by the AP to the stations STA1, STA2, and STA3. The one or more frames transmitted by the AP may be an OFDMA frame (for example, a DL OFDMA data frame), one or more OFDM frames (for example, one or more OFDM BAR frames), or the like.

Figure 7A:
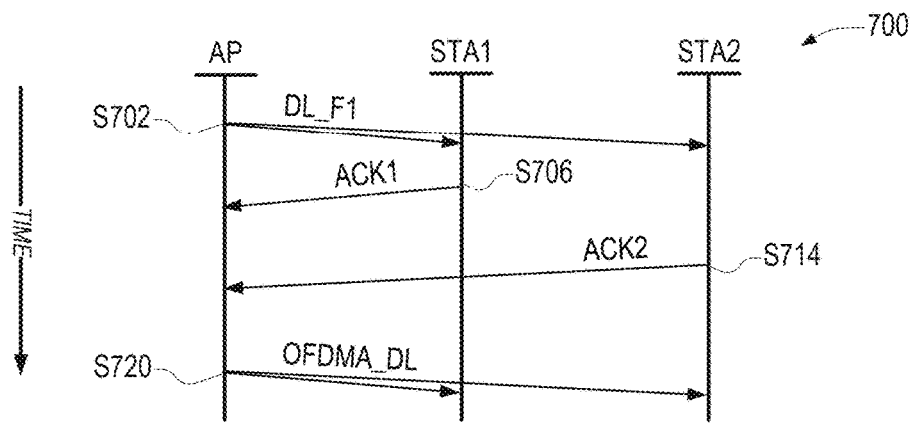
FIG. 7A illustrates an Access Point (AP) initiated Wireless Local Area Network (WLAN) operations that include implicit channel sounding according to an embodiment.
Figure 7B:
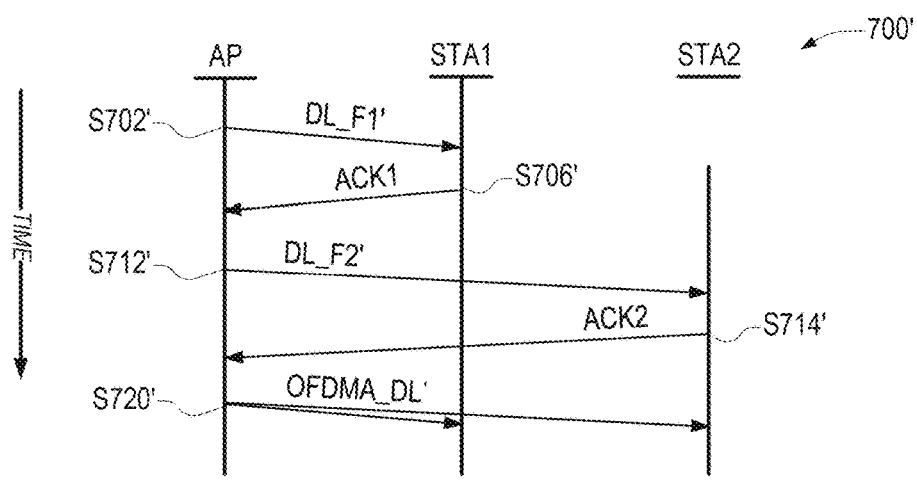
FIG. 7B illustrates AP initiated WLAN operations that include implicit channel sounding according to another embodiment.

FIGS. 7A and 7B illustrates Access Point (AP) initiated WLAN operations 700 and 700', respectively, that include implicit channel sounding according to some embodiments. In FIG. 7A and FIG. 7B, the AP transmits one or more downlink (DL) data frames to stations STA1 and STA2 and receives corresponding ACK or BA responses from the stations STA1 and STA2. The one or more DL frames may be separate OFDM frames such as illustrated in FIG. 7B, or may be a multi-user frame, such as a broadcast frame, MU MIMO frame, or OFDMA frame as illustrated in FIG. 7A. In both cases, the AP expects to receive ACK or BA frames from the intended stations as respective responses to the one or more DL frames, including stations STA1 and STA2, addressed in a previously sent multiuser frame (e.g., frame DL_F1 in FIG. 7A), or addressed in multiple OFDM frames (e.g., frames DL_F1' and DL_F2' of FIG. 7B).

In a process disclosed herein, the stations STA1 and STA2 may send their respective ACK or BA frames using specific formats that may be used by the AP to determine information (e.g., channel state information (CSI) for various sub-bands or RUs between the AP and the stations STA1 and STA2). The sub-band or RU CSI can be used to configure the transmission of subsequent DL or UL OFDMA frames scheduled by the AP for a group of stations including stations STA1 and STA2.

In some cases, the stations STA1 and STA2 may respond with an ACK or BA frame that is transmitted in the same bandwidth as the preceding DL frame. The stations STA1 and STA2 may respond with ACK or BA frames in non-HT duplicate format such as that shown in FIG. 8, which is shown for 80 MHz bandwidth. The duplication structure of FIG. 8 can be applied for non-HT duplicate formats with bandwidths of 40 MHz, 80 MHz, 160 MHz or 80+80 MHz. However, embodiments are not limited to that shown in FIG. 8, and the stations may respond with ACK or BA frames in HT, VHT or HE formats with a bandwidth of 40 MHz, 80 MHz, 160 MHz or 80+80 MHz.

Referring to FIG. 7A, a BSS includes an AP and first and second OFDMA-capable stations STA1 and STA2. An OFDMA-capable station is a station that is (at least) capable of receive and decoding data transmitted to the station in an OFDMA frame.

At S702, the first and second stations STA1 and STA2 receive a first DL frame DL_F1 from the AP. The first DL frame DL_F1 may include one or more of a MAC Control Frame, a MAC Data frame, or a MAC Management frame. In some embodiments, the first DL frame DL_F1 may be an OFDM or OFDMA frame. The first DL frame DL_F1 may be transmitted with a widest allowed bandwidth, as previously described.

In an embodiment, the first DL frame DL_F1 upon reception by a station (STA1 or STA2) prompts the station to transmit a frame, for example, an ACK frame or Block ACK frame, adapted for implicit OFDMA sounding.

At S706, the first station STA1 transmits a first ACK frame ACK1 in response to the first DL frame DL_F1. In an embodiment, the first ACK frame ACK1 is an OFDM frame with a bandwidth that mirrors the bandwidth of the first DL frame DL_F1. In an embodiment, the first DL frame DL_F1 will have a bandwidth that is greater than 20 MHz.

For example, when the first DL frame DL_F1 has a bandwidth of 40 MHz, 80 MHz, 160 MHz, or 80+80 MHz, the first ACK frame ACK1 may have a bandwidth of up to 40 MHz, 80 MHz, 160 MHz, or 80+80 MHz, respectively. The bandwidth of the first ACK frame ACK1 may be less than the bandwidth of the first DL frame DL_F1 when the first station STA1 senses that one or more secondary channels within the bandwidth of the first DL frame DL_F1 are in use.

In an embodiment, the AP transmits the first DL frame DL_F1 using the widest allowed bandwidth available between the AP and station STA1.

In response, the first station STA1 transmits the first ACK frame ACK1 at the widest allowed bandwidth between the first station STA1 and the AP and that mirrors (i.e., that is less than or equal to) the bandwidth of the first DL frame DL_F1.

Figure 8:
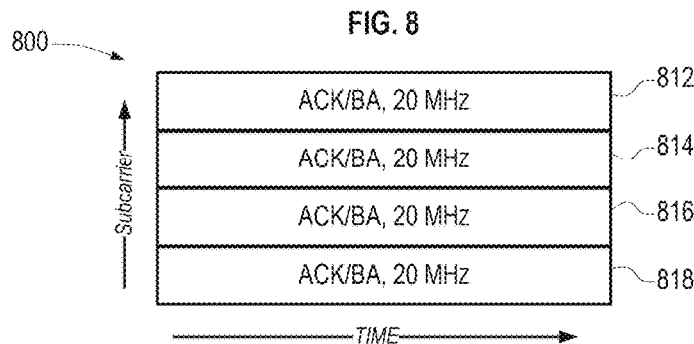
FIG. 8 illustrates a frame with duplicate Acknowledge (ACK) or Block ACK (BA) frames according to an embodiment.

When the widest allowed bandwidth (e.g., 80 MHz such as illustrated in FIG. 8) is wider than a minimum bandwidth (e.g., 20 MHz) of a frequency segment (e.g., a 5 GHz band), the first ACK frame ACK1 may include information duplicated across the widest allowed bandwidth.

In an embodiment, the first ACK frame ACK1 may include a bandwidth indicator that indicates the bandwidth of the ACK frame ACK1.

In an embodiment, the first ACK frame ACK1 may be in the form of a non-HT duplicated frame such as illustrated in FIG. 8, which is an illustrative non-HT duplicate frame with a bandwidth of 80 MHz. In another embodiment, the first ACK frame ACK1 may be in the form of a non-HT duplicate frame having any of a 40 MHz bandwidth, a 160 MHz bandwidth, and an 80+80 MHz bandwidth. In another embodiment, the first ACK frame ACK1 may be in the form of a HT, VHT, or HE formats with a bandwidth of 40 MHz, 80 MHz, 160 MHz, or 80+80 MHz.

In an embodiment, the AP determines first OFDMA sub-band CSI for a first sub-channel of a channel between the AP and the first station STA1 by using the first ACK frame ACK1, such as by respectively determining one or more of an RSSI, a SINR, and MCS, and an NSS for each of a plurality of resource units or sub-bands of the first ACK frame ACK1. The OFDMA sub-band or resource unit with best CSI may be used by the AP for exchanging subsequent UL and DL OFDMA frames with the first station STA1.

At S714, the second station STA2 transmits a second ACK frame ACK2. In an embodiment, the second ACK frame ACK2 is an OFDM frame. The second station STA2 transmits the second ACK frame ACK2 with a bandwidth that mirrors the bandwidth of the first DL frame DL_F1.

In an embodiment, the second ACK frame ACK2 may be in the form of a non-HT duplicated frame such as illustrated in FIG. 8, which is an illustrative non-HT duplicate frame having 80 MHz bandwidth. In an embodiment, the second ACK frame ACK2 may be in the form of a non-HT duplicate frame having any one of a 40 MHz bandwidth, a 160 MHz bandwidth, and an 80+80 MHz bandwidth. In an embodiment, the second ACK frame ACK2 may have one of a HT, VHT and HE formats, and may have a bandwidth of any one of 40 MHz, 80 MHz, 160 MHz, and 80+80 MHz.

In an embodiment, the AP determines second OFDMA sub-band CSI for a second sub-channel of the channel that includes the first sub-channel between the AP and the second station STA2 by using the second ACK frame ACK2, such as by respectively determining one or more of an RSSI, a SINR, and MCS, and an NSS for each of a plurality of sub-bands or RUs of the second ACK frame ACK2.

The AP then allocates sub-bands or RUs to the stations STA1 and STA2 based on the first and second OFDMA sub-band CSI. At S720 the AP transmits a DL OFDMA frame OFDMA_DL based on the allocation of the sub-bands or RUs, so that the DL OFDMA frame OFDMA_DL includes 1) first data intended for delivery to station STA1 and transmitted using one or more sub-bands or RUs that have been allocated to first station STA1, and 2) second data intended for delivery to the second station STA2 and transmitted using one or more sub-bands or RUs that have been allocated to the second station STA2.

In another embodiment, shown in FIG. 7B, the second station STA2 may transmit the second frame ACK2 after receiving a second DL frame DL_F2' from the AP at S712'. The second DL frame DL_F2' may include one or more of a MAC Control Frame, a MAC Data frame, or a MAC Management frame. The second DL frame DL_F2'may be transmitted at the widest allowed bandwidth, as previously described. In an embodiment, the second DL frame DL_F2' may include an indication that implicit OFDMA sub-band sounding is requested. Upon reception of the second DL frame DL F2', the second station STA2 transmits to the AP a second ACK frame ACK2 with a bandwidth that mirrors the bandwidth of the second DL frame DL_F2'. In some cases, the bandwidth used to transmit the second ACK frame BA2 may be the widest allowed bandwidth between the AP and the second station STA2. In an embodiment, the widest allowed bandwidth is greater than a bandwidth of 20 MHz, for example a bandwidth of any one of 40 MHz, 80 MHz, 160 MHz, and 80+80 MHz.

The AP may determine respective CSI of the sub-bands or RUs of the respective channels between the AP and the stations STA1 and STA2 using the first ACK frame ACK1 and the second ACK frame ACK2, respectively. Based on the determined CSI, the AP allocates the sub-bands or RUs to the stations STA1 and STA2, as well as to other stations that may be part of the same BSS. At S720', the AP transmits an DL OFDMA frame OFDMA_DL' based on the allocation of the sub-bands or RUs, so that the DL OFDMA frame OFDMA_DL' includes 1) first data intended for delivery to station STA1 and transmitted using one or more sub-bands or RUs that have been allocated to first station STA1, and 2) second data intended for delivery to the second station STA2 and transmitted using one or more sub-bands or RUs that have been allocated to the second station STA2.

Figure 7C:
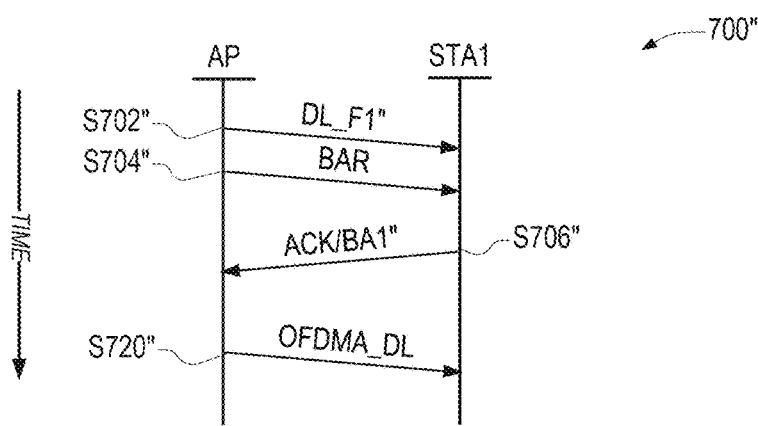
FIG. 7C illustrates AP initiated WLAN operations that include implicit channel sounding according to another embodiment.

FIG. 7C illustrates an AP initiated WLAN operation 700" that include implicit channel sounding according to another embodiment. FIG. 7C illustrates a station STA1 transmitting a response frame ACK/BA1" in response to receiving a Block Acknowledgement Request (BAR) frame BAR.

In an embodiment, the response frame ACK/BA1" may be a Block ACK (BA) frame. In an embodiment, the response frame ACK/BA1" may be an ACK frame.

At S702", the AP transmits a DL frame DL_F1" to the station STA1. In some embodiments, the DL frame DL_F1" may be an OFDM frame or an OFDMA frame. After transmitting the DL frame DL_F", at S704" the AP transmits the BAR frame BAR to the station STA1.

In an embodiment, the AP may transmit the BAR frame to the station STA1 using the widest allowed bandwidth available between the AP and the station STA1. In an embodiment, the widest allowed bandwidth is a bandwidth that is greater than 20 MHz, such as a bandwidth of 40 MHz, 80 MHz, 160 MHz, or 80+80 MHz.

Upon receiving the BAR frame BAR, at S706" the station STA1 transmits the response frame ACK/BA1" with a bandwidth that mirrors the bandwidth of the BAR frame, which as previously described, may be the widest allowed bandwidth. In an embodiment, the response frame ACK/BA1" may be an OFDM frame. By using the widest allowed bandwidth for transmitting the response frame ACK/BA1, the AP has an opportunity to determine the respective CSI of the widest range of sub-bands or RUs that may be available in the channel or channels between the AP and the station STA1. Based on the CSI of the sub-bands or RUs between the AP and the station STA1, the AP allocates one or more sub-bands or RUs to the station STA1. At S720" the AP transmits a DL OFDMA frame OFDMA_DL including data intended for delivery to the station STA1, wherein the data intended for delivery to the station STA1 is transmitted using the one or more sub-bands or RUs that have been allocated to the station STA1.

When the AP and station STA are engaged in Single User (SU) transmission then process 700" happens between the AP and the station STA1. The AP transmits a BAR frame BAR in a specific format described herein. The station STA1 responds with the response frame ACK/BA1 in a specific format and that is transmitted in the same bandwidth as the BAR frame BAR.

When the AP and several stations are engaged in a DL MU transmission (such as an 802.11ac DL MU MIMO transmission or an 802.11ax DL OFDMA transmission) then this process happens between the AP, which sends a BAR frame for each station in a specific format described here, and each of the stations that responds with an ACK or BA frame in a specific format that mirrors the initial BAR frame.

FIG. 8 illustrates a frame 800 suitable for use in an OFDMA sub-band sounding process, such as the OFDMA sub-band sounding performed as part of the respective WLAN operations 700, 700', and 700"of FIGS. 7A, 7B, and 7C, according to an embodiment. The frame 800 may be an OFDM uplink frame.

The frame 800 is transmitted at a widest available bandwidth, which in the example shown in FIG. 8 is 80 MHz. The frame 800 includes an ACK or BA frame 818 having a 20 MHz bandwidth and first, second, and third duplicate frames 812, 814, and 816 each occupying additional respective 20 MHz bandwidths. The first, second, and third duplicate frames 812, 814, and 816 that are included in frame 800 are identical in content to the ACK or BA frame 818, and are used to duplicate the ACK or BA frame 818 across the 80 MHz widest allowed bandwidth of the frame 800.

In an embodiment, the frame 800 may be in a legacy non-HT duplicate format. In an embodiment, the frame 800 may be in a VHT or HE format, in which case no explicit duplication is needed.

In an embodiment, when a BA frame is sent as an immediate response to either an implicit BA request of a previous frame or to a BAR frame included in the previous frame, and the previous frame is a non-HT PPDU, the BA frame has one of a non-HT PPDU format, a HT PPDU format, a VHT PPDU format, and an HE PPDU format, and the rate and bandwidth of the BA frame is selected as follows.

A primary rate is defined to be a highest rate in a BSSBasicRateSet parameter that is less than or equal to a rate of the previous frame. When no rate in the BSSBasicRateSet parameter meets these conditions, the primary rate is defined to be a highest mandatory rate of an attached PHY that is less than or equal to the rate of the previous frame. The BSSBasicRateSet is the list of data rates that must be supported by any station wishing to join a BSS network.

The station that is about to send the responsive BA frame may set the CH_BANDWIDTH parameter of the BA frame based on the CH_BANDWIDTH parameter value of the DL frame that includes the data PPDU or based on the CH_BANDWIDTH parameter value of the BAR frame of the data PPDU (e.g., data PPDU of the DL frame of FIGS. 7a, 7b, and 7c) that was received previously.

For example, in an embodiment, the CH_BANDWIDTH parameter value of the TXVECTOR of the BA frame to be sent by the station may be set to equal to the CH_BANDWIDTH parameter value of the DL frame that includes the non-HT PPDU. In another embodiment, when the AP transmits a BAR frame, the CH_BANDWIDTH parameter value of the TXVECTOR of the BA frame to be sent by the station may be set to equal to the CH_BANDWIDTH parameter value of the RXVECTOR of the BAR frame, however the format of the BAR frame may vary. The TXVECTOR represents a list of parameters that the MAC sublayer provides to the local PHY entity in order to transmit a PSDU. The RXVECTOR represents a list of parameters that the PHY provides the local MAC entity upon receipt of a valid PLCP header or upon receipt of the last PSDU data bit in the received frame.

In an embodiment the BAR frame may be sent by the AP in non-HT duplicate format. In an embodiment, when a CH_BANDWIDTH_IN_NON_HT parameter of the TXVECTOR at the AP is set to larger than 20 MHz, the scrambling sequence carries the TXVECTOR parameter CH_BANDWIDTH_IN_NON_HT, and the TA field value is the address of the STA that will be transmitting the BA frame or a bandwidth signaling TA. In the case where the BA frame to be transmitted by the STA is in a non-HT or non-HT duplicate format and where the scrambling sequence carries the TXVECTOR parameter CH_BANDWIDTH_IN_NON_HT, such as the case described above, the TA field value is a bandwidth signaling TA. The scrambling sequence is generated when the PLCP DATA scrambler scrambles transmit data during the PPDU encoding process.

In another embodiment, the BAR frame may be sent in HT format when the CH_BANDWIDTH parameter value of the RXVECTOR is 40 MHz. In yet another embodiment, the BAR frame may be sent in VHT format when the CH_BANDWIDTH parameter value of the RXVECTOR is 40 MHz, 80 Mhz, 160 Mhz, or 80+80 MHz. In another embodiment, the BAR frame may be sent in HE format when the CH_BANDWIDTH parameter value of the RXVECTOR is 40 MHz, 80 Mhz, 160 Mhz, or 80+80 Mhz.

Note that although the above-described procedures for selecting the rate and bandwidth was explained with respect to BA frames, the same procedures may be employed for selecting rate and bandwidths for an ACK frame. In such implementations, it may be assumed that the AP and the STA are engaged in a SU frame exchange and the STA sends ACK frame immediately after the DL data frame. While the DL data frame may be a non-OFDMA frame, the procedure described here would allow the AP to gather information that later can be used for determining sub-band or RU allocations for exchanging subsequent DL or UL OFDMA frames.

In an embodiment, when an ACK control response frame is carried in a non-HT PPDU, the primary rate may be defined as the highest rate in the BSSBasicRateSet parameter that is less than or equal to the rate of the previous frame. When no rate in the BSSBasicRateSet parameter meets these conditions, the primary rate may be defined as the highest mandatory rate of the attached PHY that is less than or equal to the rate of the previous frame. The STA shall transmit the non-HT PPDU ACK control response frame at either the primary rate, or an alternate rate, when one exists. For example, an alternate rate may be selected provided that all of the following conditions are met: 1) the duration of the frame at the alternate rate is the same as the duration of the frame at the primary rate determined by section 9.7.6.5.2 of IEEE Std 802.11™-2012; 2) the alternate rate is in either the BSSBasicRateSet parameter or is a mandatory rate of the attached PHY; and 3) the modulation class of the frame at the alternate rate is the same class as that of the primary rate selected by section 9.7.6.5.2 of IEEE Std 802.11™-2012.

In an embodiment, the CH_BANDWIDTH parameter of the ACK frame sent in response to a data PPDU may be based on the CH_BANDWIDTH parameter value of the data PPDU. The CH_BANDWIDTH parameter value of the RXVECTOR of the data PPDU frame may be equal to the CH_BANDWIDTH parameter value of the TXVECTOR of the ACK frame. However the format of the ACK frame may vary.

For example, in an embodiment, the ACK frame may be sent in a non-HT duplicate format. In this embodiment, when the CH_BANDWIDTH _N_NON_HT parameter of the TXVECTOR is set to larger than 20 MHz, the scrambling sequence carries the TXVECTOR parameter CH_BANDWIDTH_IN_NON_HT, and the transmitter address (TA) field value is the address of the STA transmitting the frame or a bandwidth signaling TA. In the ACK frame transmitted by the STA in a non-HT or non-HT duplicate format and where the scrambling sequence carries the TXVECTOR parameter CH_BANDWIDTH_IN_NON_HT, such as in the case described above, the TA field value is a bandwidth signaling TA.

In an embodiment, the ACK frame may be sent in an HT format when the CH_BANDWIDTH parameter value of the RXVECTOR is 40 MHz. In another embodiment, the ACK frame may be sent in VHT format when the CH_BANDWIDTH parameter value of the RXVECTOR is one of 40 MHz, 80 MHz, 160 MHz, and 80+80 MHz. In another embodiment, the ACK frame may be sent in HE format when the CH_BANDWIDTH parameter value of the RXVECTOR is one of 40 MHz, 80 MHz, 160 MHz, and 80+80 MHz.

In the above described embodiments, the STA may respond to the BAR frame or a DL data frame sent by the AP by sending a BA or ACK frame that has the same bandwidth as the bandwidth of the BAR frame or the DL data frame.

In some embodiments, an indicator may be included in the BAR frame to indicate a requested bandwidth for the BA or ACK frame. When the BAR frame is in a non-HT duplicate format, the bandwidth indicator may be included in the structure of the non-HT duplicated frame. When the BAR frame is in VHT or HE format, the bandwidth indicator may be in the VHT or HE frame.

In an embodiment, the bandwidth indicator may be compliant with an IEEE 802.11 standard (e.g., the 802.11ac or 802.11ax standards). Using the bandwidth indicator, a STA may determine a bandwidth of the BAR frame and prepare an appropriate response frame, as described above.

However, in an embodiment, the bandwidth indicator may be provided in the payload of the BAR frame, as will be described herein.

Figure 9A:
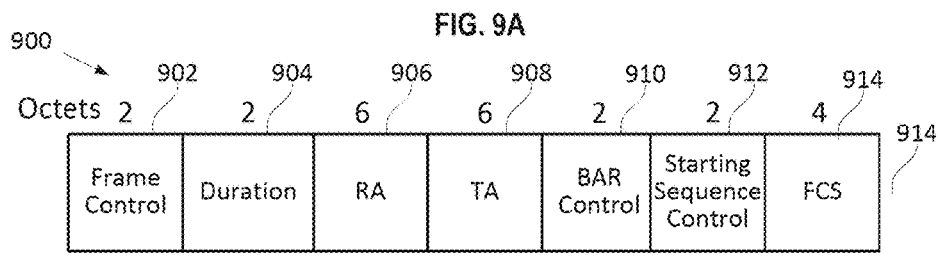
FIG. 9A illustrates a Block Acknowledgement Request (BAR) frame according to an embodiment.
Figure 9B:
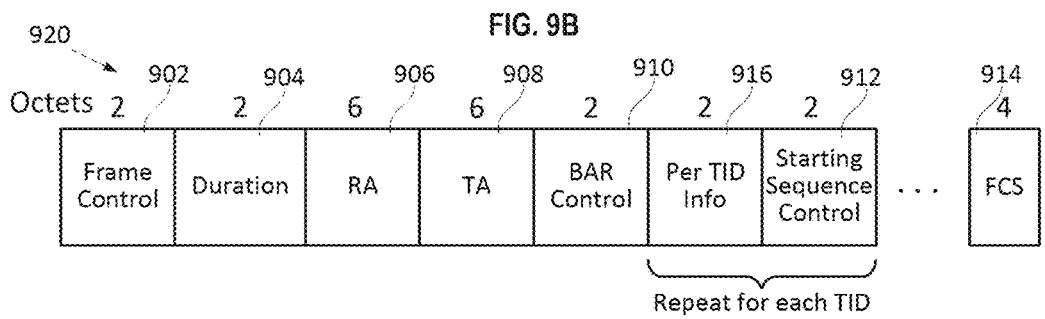
FIG. 9B illustrates a Multi-Traffic Identifier (TID) BAR frame according to an embodiment.
Figure 9C:
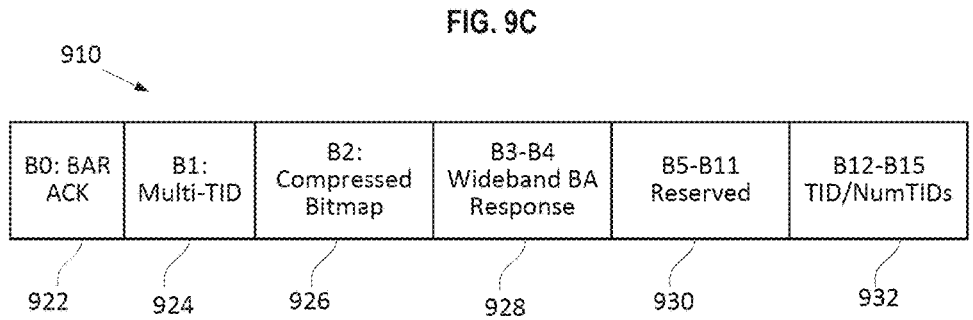
FIG. 9C illustrates the BAR Control fields of FIGS. 10A and 10B according to an embodiment.

In an embodiment, a BAR frame may be provided by the AP that provide indications related to implicit sounding in the BAR Control and Starting Sequence Control fields. FIGS. 9A, 9B, and 9C show a BAR control portion in accordance with embodiments, in which a two-bit wide Wideband BA Response subfield 928 is included in the BAR control field 910." In an embodiment, the Wideband BA Response field may be encoded as described below.

The Wideband BA Response subfield 928 having a value of 00 indicates that a BA response frame should be sent with 20 MHz bandwidth, i.e., a CH_BANDWIDTH_IN_NON_HT or a CH_BANDWIDTH parameter of the TXVECTOR is set to 20 MHz.

The Wideband BA Response subfield 928 having a value of 01 indicates that the BA response frame should be sent with 40 MHz bandwidth, i.e., the CH_BANDWIDTH_IN_NON_HT or CH_BANDWIDTH parameter of the TXVECTOR is set to 40 MHz.

The Wideband BA Response subfield 928 having a value of 10 indicates that the BAR frame should be sent with 80 MHz bandwidth, i.e., the CH_BANDWIDTH_IN_NON_HT or CH_BANDWIDTH parameter of the TXVECTOR is set to 80 MHz.

The Wideband BA Response subfield 928 having a value of 11 then indicates that the BAR frame should be sent with 160 MHz or 80+80 MHz bandwidth, i.e., the CH_BANDWIDTH_IN_NON_HT or CH_BANDWIDTH parameter of the TXVECTOR is set to 160 MHz or 80+80 MHz.

Referring to FIG. 9A, which illustrates a BAR (Block ACK Request) frame 900 and its components including a Frame Control field 902, a Duration field 904, a Receiver Address (RA) field 906, a Transmitter Address (TA) field 908, a BAR Control Field 910, a Block ACK Starting Sequence Control field 912, and a Frame Check Sequence (FCS) field 914.

The Frame Control field 902 is used to indicate, for example, the protocol version being used, the frame type or sub-type (e.g., BAR frame) that the frame is a control frame, and so forth. The Duration field 904 is used to reserve the medium for a fixed time period. The RA field 906 is the address of the receiver that is to receive the BAR frame, which in this case is a station. The TA field 908 is the address of the transmitter of the BAR frame, which in this case is the AP.

The BAR Control field 910 is 16 bits long and may be used to provide various information including, for example, indicating whether an immediate acknowledgement is or is not expected (as indicated by B0: BAR ACK of FIG. 9C), to determine which of three possible BlockAckReq frame variants is represented (as indicated by the B1: Multi-TID and B2: Compressed Bitmap), and so forth. The Block ACK Starting Sequence Control field 912 contains the sequence number of the first MSDU or A-MSDU for which the BAR frame is sent. The FCS field 914 is a 32-bit field containing a 32-bit cyclic redundancy code (CRC).

FIG. 9B illustrates a Multi-Traffic Identifier (TID) BAR frame 920. The Multi-TID BAR frame 920 includes the same components as the BAR frame 900 of FIG. 9A except that the Multi-TID BAR frame 920 includes one or more Starting Sequence Control fields 912 and respective Per TID Info fields 916. The Per TID Info field 916 includes 12 bits that are reserved and 4 bits for TID value.

Both the BAR frame 900 and the Multi-TID BAR frame 920 have the BAR Control field 910. In an embodiment, the BAR Control field 910 may include the Wideband BA Response subfield 928 for indicating a preferred bandwidth for the BA response frame that a responding station may subsequently send. FIG. 9C illustrates the contents of the BAR Control fields 910 of FIGS. 9A and 9B including the Wideband BA Response subfield 928 according to some embodiments.

The BAR Control field 910, in addition to the Wideband BA Response subfield 928, includes a BAR ACK subfield 922, a Multi-TID subfield 924, a Compressed Bitmap subfield 926, a Reserved subfield 930, and a TID/NumTIDs subfield 932. The BAR ACK subfield 922 indicates whether the recipient of the BAR is required to transmit an immediate acknowledgement. The values of the Multi-TID subfield 924 and the Compressed Bitmap subfield 926 determines which of three possible BAR frame variants is represented (i.e., Basic BlockAckReq, Compressed BlockAckReq, or Multi-TID BlockAckReq). Seven bits of the 16 bit BAR Control field 910 are included in the Reserved subfield 930, and four bits are for the TID/NumTIDs subfield 932.

With respect to the Wideband BA Response subfield 928, there are two bits reserved for the Wideband BA Response subfield 928. Thus, one of at least four different values may be provided in the Wideband BA Response subfield 928 to indicate one of at least four different bandwidths (e.g., any one of 20 MHz, 40 MHz, 80 MHz, and 160 MHz).

In an embodiment, a STA that receives a BAR frame with the Wideband BA Response field may prepare the BA frame in accordance with 802.11 standards. However, the bandwidth of the BA frame, i.e. CH_BANDWIDTH_IN_NON_HT or CH_BANDWIDTH parameter of the TXVECTOR may be set according to the value of the Wideband BA Response field. The format of the BA frame, i.e. whether it should be sent in non-HT duplicate or VHT or HE formats may be decided at the STA as described above.

In an embodiment, the above-described behaviors of the AP and a STA may be based on the capability of the STA. In other words, a STA might perform as described above only when its capability allows, otherwise it may send the BA or ACK frames according to the existing rules in the 802.11 specifications (e.g., 802.11ac, 802.11ax, etc.). Thus, in some embodiments a capability field may be included into certain uplink (UL) frames, such as management frames, transmitted by the STA in order to "announce" the capabilities of the STA.

In an embodiment, the capability field that may be included in UL frames is described in the following. Since such capabilities may be applied to the next-generation of 802.11 devices (such 802.11ax or HE devices), the capability field may be a HE Capabilities element. There are several fields that may be included in the HE Capabilities element that specifies the capabilities of the device. In an embodiment, a Wideband ACK Capability field may be included into UL frames, such as management frames, which in one implementation has one bit width where it is set as follows:

For AP devices the Wideband ACK Capability field may be reserved. For STA devices the Wideband ACK Capability field may be set to 1 when the STA is capable of sending ACK or BA frames with bandwidth wider than 20 MHz, otherwise the Wideband ACK Capability field may be set to zero. Also note that the Wideband ACK capability field may be assigned to other HE elements, but its usage should be as described above.

In another embodiment, the Wideband ACK Capability field might have two or more bits where its setting is as follows:

The Wideband ACK Capability field may be set to 1 when the STA is capable of sending ACK or BA frames with a bandwidth of 40 MHz. The Wideband ACK Capability may be set to 2 when the STA is capable of sending ACK or BA frames with a bandwidth of 80 MHz. The Wideband ACK Capability may be set to 3 when the STA is capable of sending ACK or BA frames with a bandwidth of 160 MHz or 80+80 Mhz. The Wideband ACK Capability may be set to 0 when the STA is only capable of sending ACK or BA frames with a 20 MHz bandwidth.

Figure 10:
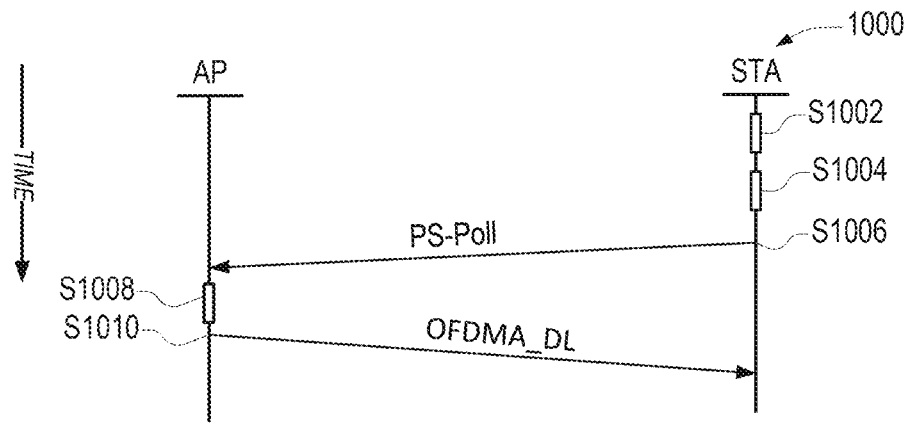
FIG. 10 illustrates a station-initiated process using a PS-Poll frame adapted for implicit OFDMA sounding according to another embodiment.

FIG. 10 illustrates a station-initiated process 1000 using a PS-Poll frame adapted for implicit OFDMA sounding, according to an embodiment.

At S1002, a station STA transitions out of power save (PS) mode and sends PS-Poll frame in HE format. In some embodiments, a PS-Poll frame or a variant of PS-Poll frame may carry an HE Control (HEC) field. Such a variant of PS-Poll frame might be denoted as enhanced PS-Poll frame or the like, and may be carried in an HE PPDU format, or any PPDU format that is capable of carrying the HEC field or any control field with the following attributes.

HEC field is an extension of HT Control field, and may be placed after the address fields in the MAC header of the PS-Poll frame. Within the HEC field, the STA places additional sub-fields that carry useful information for the AP that the STA is associated.

In some embodiments, the rate adaptation sub-field is carried in the HEC field where it carries CSI, SNR, MCS, or NSS for one or more 20 MHz sub-channels that the STA operates at, or carries CSI, SNR, MCS, or NSS for one or more resource-units or sub-bands. In some embodiments, a sub-field is carried in HEC of the PS-Poll frame where it indicates the transmission power of the STA or the transmission power that the STA is expected to operate at the next one or more units of time, such as Beacon Interval (BI).

In some embodiments, a sub-field is carried in HEC of the PS-Poll frame where it indicates the level of AWGN noise or interference that the STA experienced in an immediate past interval, such as one or more BIs. In some embodiments, a sub-field is carried in HEC of the PS-Poll frame where it indicates the buffer status of one or more access categories (ACs) or Traffic Categories (TCs) or Traffic Indicators (TIDs). In some embodiments, a sub-field is carried in HEC of the PS-Poll frame where it indicates the receive operating mode indication which indicates any change in receiver operation, either in bandwidth, number of spatial streams or both.

At S1104 the station STA determines the widest allowed bandwidth that may be employed in order to transmit a subsequent frame such as a PS-Poll frame. In an embodiment, the widest allowed bandwidth is a bandwidth that is greater than 20 MHz.

After determining the widest allowed bandwidth, and as a result of coming out of the PS mode, the station STA may transmit to the AP a frame at S1006. In an embodiment, the frame may include an IEEE Std 802.11-2012 PS-Poll frame. Upon receiving the PS-Poll frame PS-Poll, the AP at S1008 determines CSI of the sub-bands or sub-carriers (or RUs).

The AP may use the determined sub-band CSI (or RU CSI) to select one or more sub-bands or RUs for transmitting data to the station STA using an DL OFDMA frame or for receiving data from the station using an UL OFDMA frame. For example, the AP may use the selected one or more sub-bands or RUs for transmitting the data to the AP via a DL frame OFDMA_DL at S1010.

Figure 11:
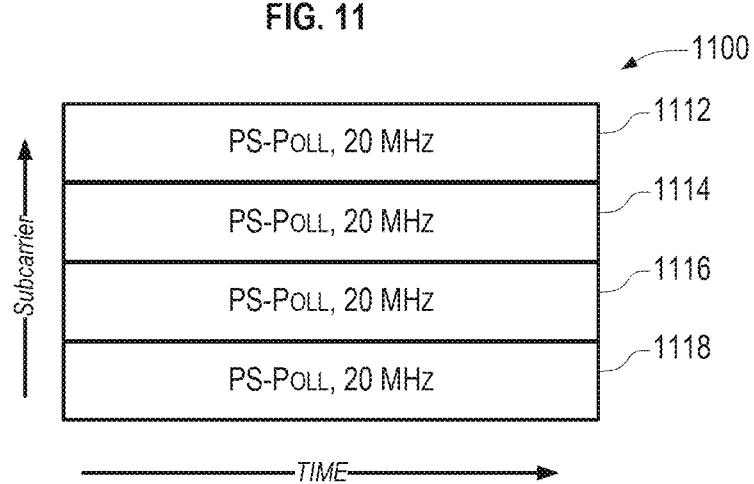
FIG. 11 illustrates a frame with duplicate PS-poll frames according to an embodiment.

In the embodiments related to FIG. 10 and FIG. 11, the STA may transmit to the AP a PS-Poll frame using the widest bandwidth that both the AP and the STA are configured to operate over and that the condition of the wireless medium allows (that is, the widest allowed bandwidth). For the embodiments, after the STA exits a power save mode, the STA sends the PS-Poll frame to the AP. The PS-Poll frame indicates to the AP that the STA is out of sleep mode and ready to receive one or more DL payloads associated with the STA. The AP acknowledges the reception of the PS-Poll frame and may subsequently send the DL payloads, if any, to the STA. In some cases, the AP may send the DL payload immediately after the reception of the PS-Poll frame. In an embodiment, the DL payload may be transmitted to the STA via an OFDMA_DL frame.

In the PS-Poll procedure shown in FIG. 10, the STAs send PS-Poll frames in specific formats. The formats of the PS-Poll frames enable the AP to collect sub-carrier information, sub-band or RU information, or both for the widest bandwidth possible (e.g., "widest allowed bandwidth" or "widest possible bandwidth").

In an embodiment, a STA may send a PS-Poll frame in a non-HT duplicate format such as shown in FIG. 11, which is shown for 80 MHz bandwidth. However, embodiments are not limited thereto, and the duplication structure of FIG. 11 may be applied for non-HT duplicate formats with bandwidths of any of 40 MHz, 80 MHz, 160 MHz, and 80+80 MHz. In another embodiment, the PS-Poll frame may be sent in a HT, VHT, or HE format with a bandwidth of any of 40 MHz, 80 MHz, 160 MHz, and 80+80 MHz. As previously described, regardless of whether the PS-Poll frame is in a non-HT duplicate format, an HT format, a VHT format, or an HE format, the PS-poll frame should be sent using the widest allowed bandwidth.

For example, in an embodiment, a STA may send the PS-Poll frame in non-HT duplicate format with a CH_BANDWIDTH_IN_NON_HT parameter of the TXVECTOR set to a 160 MHz (or 80+80 MHz) bandwidth when both the AP and the STA operate with the 160 MHz (or 80+80 MHz) bandwidth and the secondary 20 MHz, the secondary 40 MHz, and the secondary 80 MHz channels are not sensed BUSY by the STA at a Point Coordination Function (PCF) Interframe Space (PIFS) time before transmission of the PS-Poll frame. In this case, the widest allowed bandwidth is 160 MHz (or 80+80 MHz) bandwidth.

In an embodiment, the STA may send the PS-Poll frame in non-HT duplicate format with a CH_BANDWIDTH_IN__NON_HT parameter of the TXVECTOR set to 80 MHz when either (a) 80 MHz is the maximum bandwidth at which the STA operates (i.e., the operational bandwidth of the STA at the time that the STA associated with the AP or a narrower bandwidth when that was announced in an Operating Mode Notification sent by the STA or the AP), or (b) both the AP and the STA operate at a wider than 80 MHz bandwidth (that is, both the STA and the AP can operate using a 160 MHz or a 80+80 MHz bandwidth) and the secondary 80 MHz channel is sensed BUSY by the STA at a PIFS time before transmission of the frame. For this case, the widest allowed bandwidth is 80 MHz.

In another embodiment, the STA may send the PS-Poll frame in non-HT duplicate format with a CH_BAND-WIDTH_IN_NON_HT parameter of the TXVECTOR set to 40 MHz when either (a) 40 MHz is the maximum bandwidth at which the STA operates (i.e. the operational bandwidth at the time that the STA associated with the AP or a narrower bandwidth (e.g., 20 MHz) that was announced in an Operating Mode Notification sent by the STA or the AP), or (b) both AP and the STA operate in wider than 40 MHz bandwidth (e.g., 80 MHz bandwidth) and the secondary 40 MHz channel is sensed BUSY by the STA at PIFS time before transmission of the frame. For this case, the widest allowed bandwidth is 40 MHz.

In addition, when the CH_BANDWIDTH_IN_NON_HT parameter of the TXVECTOR is set to larger than 20 MHz, the TA field value may be an address of the STA transmitting the PS-polling frame or a bandwidth signaling TA. When the PS-Poll frame is transmitted by a VHT or HE STA in a non-HT or non-HT duplicate format and a scrambling sequence of the PS-Poll frame carries the TXVECTOR parameter CH_BANDWIDTH_IN_NON_HT (such as the cases described above), the TA field value of the PS-Poll frame may be the bandwidth signaling TA. When the ACK or BA frame is transmitted by the STA in a non-HT or non-HT duplicate format and the scrambling sequence carries the TXVECTOR parameter CH_BANDWIDTH_IN_NON_HT, then the TA field value may be the bandwidth signaling TA.

In an embodiment, when the PS-poll frame is to be sent in non-HT duplicate format, the PS-poll frame may be transmitted by the STA using a rate no higher than the highest rate in the BSSBasicRateSet parameter that is less than or equal to the rate or non-HT reference rate of the previously transmitted frame that was directed to the same receiving STA. When no rate in the BSSBasicRateSet parameter meets these conditions, the control frame (e.g., PS-Poll frame) may be transmitted at a rate no higher than the highest mandatory rate of the attached PHY that is less than or equal to the rate or non-HT reference rate of the previously transmitted frame that was directed to the same receiving STA.

FIG. 11 illustrates a frame 1100 that may be used in a station-initiated OFDMA sub-band sounding process according to an embodiment. The frame 1100 may be used as an uplink PS-Poll frame in the station-initiated process 1000 of FIG. 10.

The frame 1100 is transmitted at a widest available bandwidth, which in the embodiment of FIG. 11 is 80 MHz. The frame 1100 includes a PS-Poll frame 1118 having a bandwidth of 20 MHz, and first, second, and third duplicate PS-Poll frames 1112, 1114, and 1116.

The first, second, and third duplicate PS-Poll frames 1112, 1114, and 1116 are substantially identical in content to the PS-Poll frame 1118, and are used to duplicate the PS-Poll frame 1118 across the 80 MHz widest allowed bandwidth of the frame 1100.

Figure 12:
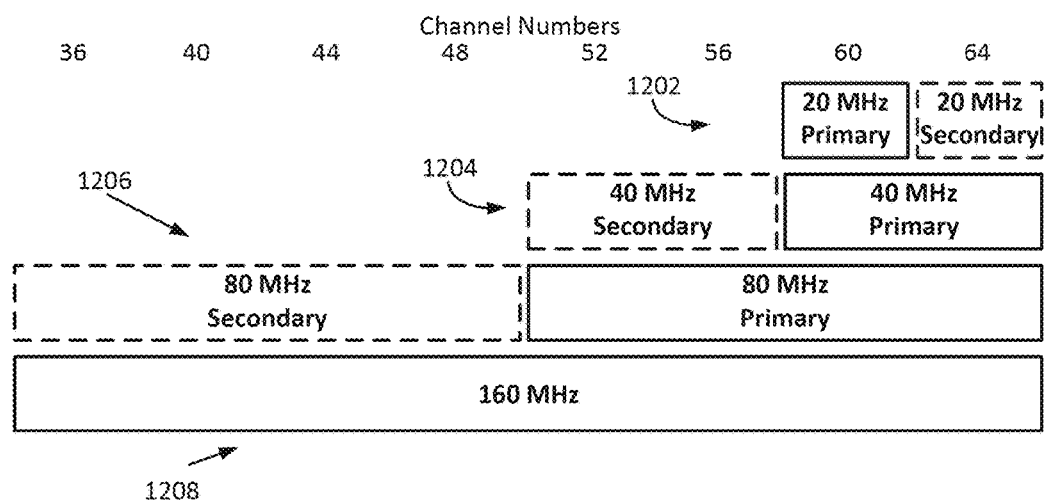
FIG. 12 illustrates relationships between primary and secondary channels of various bandwidths according to an embodiment.

FIG. 12 illustrates an illustrative relationship between various primary and secondary channels of various bandwidths in accordance with 802.11 standards such as 802.11ac standards. Each of the various bandwidths (e.g., 40 MHz, 80 MHz, 80+80 MHz, and 160 MHz) comprises of at least a primary channel and a secondary channel. For example, the 40 MHz bandwidth 1202 comprises a 20 MHz primary channel (e.g., channel 60) and a secondary 20 MHz channel (e.g., channel 64). Similarly, the 80 MHz bandwidth 1204 comprises a 40 MHz primary channel (e.g., channels 60 and 64) and a 40 MHz secondary channel (e.g., channels 52 and 56).

The 40 MHz primary channel for the 80 bandwidth 1204 comprises the 20 MHz primary channel (e.g., channel 60) and the 20 MHz secondary channel (e.g., channel 64) of the 40 MHz bandwidth 1202. In order to use the entire bandwidth of the 40 MHz bandwidth 1202 both the 20 MHz primary channel and the 20 MHz secondary channel must be free or IDLE (e.g., not BUSY). Similarly in order to use the entire bandwidth of the 80 MHz bandwidth 1204, the 40 MHz secondary channel as well as the 20 MHz secondary channel (which, along with the 20 MHz primary channel, comprises the 40 MHz primary channel) must be free (e.g., not BUSY). Note further that both the 80+80 MHz bandwidth 1206 as well as the 160 MHz bandwidth 1208 is comprised of eight 20 MHz channels (e.g., channels 36, 40, 44, 48, 52, 56, 60, and 64). Thus, in order to use the entire bandwidth of the 80+80 MHz bandwidth 1206 or the 160 MHz bandwidth 1208, the 80 MHz secondary channel, the 40 MHz secondary channel, and the 20 MHz secondary channel must not be BUSY.

In an embodiment, the STA may transmit the PS-poll frame in HT, VHT, or HE format with widest allowed bandwidths of 40 MHz, 80 MHz, 80+80 MHz, or 160 MHz. In particular, the bandwidth of the PS-poll frame when the PS-poll frame is in HT, VHT, or HE format may be as follows.

When the STA sends the PS-Poll frame in HT PPDU, VHT PPDU or HE PPDU formats, then in some embodiments the CH_BANDWIDTH parameter of the TXVECTOR is set according to the maximum bandwidth that both the AP and the STA operate (i.e. a bandwidth at the time that the STA associated with the AP or a narrower bandwidth when the narrower bandwidth was announced in an Operating Mode Notification sent by the STA or the AP) and whether the secondary 20 MHz, the secondary 40 MHz, and the secondary 80 MHz channels are sensed BUSY according to 802.11 rules.

More specifically, the CH_BANDWIDTH parameter of the TXVECTOR may be set to 40 MHz when both the AP and the STA are currently (e.g., at or just before the PS-Poll frame being transmitted) operating at a maximum bandwidth of 40 MHz, or when both the AP and the STA operate wider than the 40 MHz bandwidth but the secondary 40 MHz channel is sensed BUSY by the STA at PIFS time before transmission of the PS-poll frame. The CH_BANDWIDTH parameter of the TXVECTOR may be set to 80 MHz when both the AP and the STA are currently operating at maximum bandwidth of 80 MHz, or when both the AP and the STA operate in wider than 80 MHz bandwidth but the secondary 80 MHz channel is sensed BUSY by the STA at PIFS time before transmission of the PS-poll frame. The CH_BANDWIDTH parameter of the TXVECTOR may be set to 160 MHz (or 80+80 MHz) when both AP and STA are currently operating with bandwidth of 160 MHz (or 80+80 MHz), and the secondary 80 MHz channel is not sensed BUSY by the STA at PIFS time before transmission of the PS-poll frame. The channel sensing rule for the primary 20 MHz channel, the primary 40 MHz channel, and the primary 80 MHz channel may be in accordance with rules specified in 802.11 specifications (e.g., 802.11ac or 802.11ax).

Figure 13:
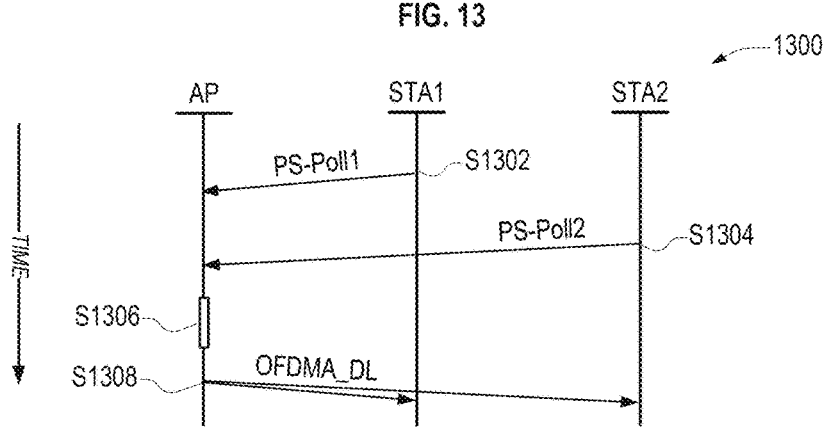
FIG. 13 illustrates a process for communicating using an OFDMA frame according to an embodiment.

FIG. 13 illustrates a multi-station initiated process 1300 using PS-polling frames adapted to implicit OFDMA sub-band or RU sounding according to some embodiments. For ease of illustration and for the sake of brevity, the process 1300 is described below with respect to only two stations, but embodiments are not limited thereto. Thus, the process 1300 may be implemented with more than two stations.

At S1302, a first station STA1 transmits to the AP a first PS-poll frame PS-Poll1 after coming out of PS mode. The first PS-poll frame PS-Poll1 is transmitted using the widest allowed bandwidth available between the first station STA1 and the AP.

At S1304, a second station STA2 transmits to the AP a second PS-poll frame PS-Poll2 after also coming out of PS mode. The second PS-poll frame PS-Poll2 is transmitted using the widest allowed bandwidth available between the second station STA2 and the AP.

At S1306, the AP determines CSI of one or more sub-bands or RUs with respect to stations STA1 and STA2 by measuring certain characteristics (e.g., one or more of an RSSI, an SINR, an MCS, and an NSS) of the received PS-poll frames PS-Poll1 and PS-Poll2. Based on the determined CSI, the AP may allocate sub-bands or RUs to stations STA1 and STA2.

At S1308, the AP sends a DL OFDMA frame OFDMA_DL to the stations STA1 and STA2. The DL OFDMA frame OFDMA_DL includes first data addressed to the first station STA1 and transmitted using one or more first sub-bands or RUs that were allocated to the first station STA1. The DL OFDMA frame OFDMA_DL also includes second data addressed to the second station STA2 and transmitted using one or more second sub-bands or RUs that were allocated to the second station STA2.

A STA may perform as described above only when its capability allows, otherwise it may send the PS-Poll frames according to the existing rules in the 802.11 specifications (e.g., 802.11ac). In an embodiment, a capability field that indicates the capability to transmit wideband control frame (e.g., ACK/BA, PS-poll frame, and the like) as described above may be included in UL frames (or DL frames) such as management frames. By including such capability fields in UL or DL frames, stations or APs can announce their capabilities to, for example, the BSS that they are affiliated with.

In an embodiment, a capability field may include an Implicit Wideband Operation field that has one bit width where it is set as described below.

For AP devices this field is reserved, for STA devices the Implicit Wideband Operation field may be set to 1 when the STA is capable of sending PS-Poll frames with a bandwidth wider than 20 MHz, otherwise this field may be set to zero. Note further that the Implicit Wideband Operation field may be assigned to other HE elements, but its usage should be as described above.

In another embodiment, the Implicit Wideband Operation field may have two or more bits where its setting is as described below.

The Implicit Wideband Operation may be set to 1 when the STA is capable of sending PS-Poll frames with bandwidth of 40 MHz. When the STA is capable of sending PS-Poll frames with a bandwidth of 80 MHz, the Implicit Wideband Operation field may be set to 2. When the STA is capable of sending PS-Poll frames with a bandwidth of 160 MHz or 80+80 MHz, the Implicit Wideband Operation field may be set to 3. Finally, when the STA is only capable of sending PS-Poll frames with a 20 MHz bandwidth, the Implicit Wideband Operation field may be set to zero.

Figure 14:
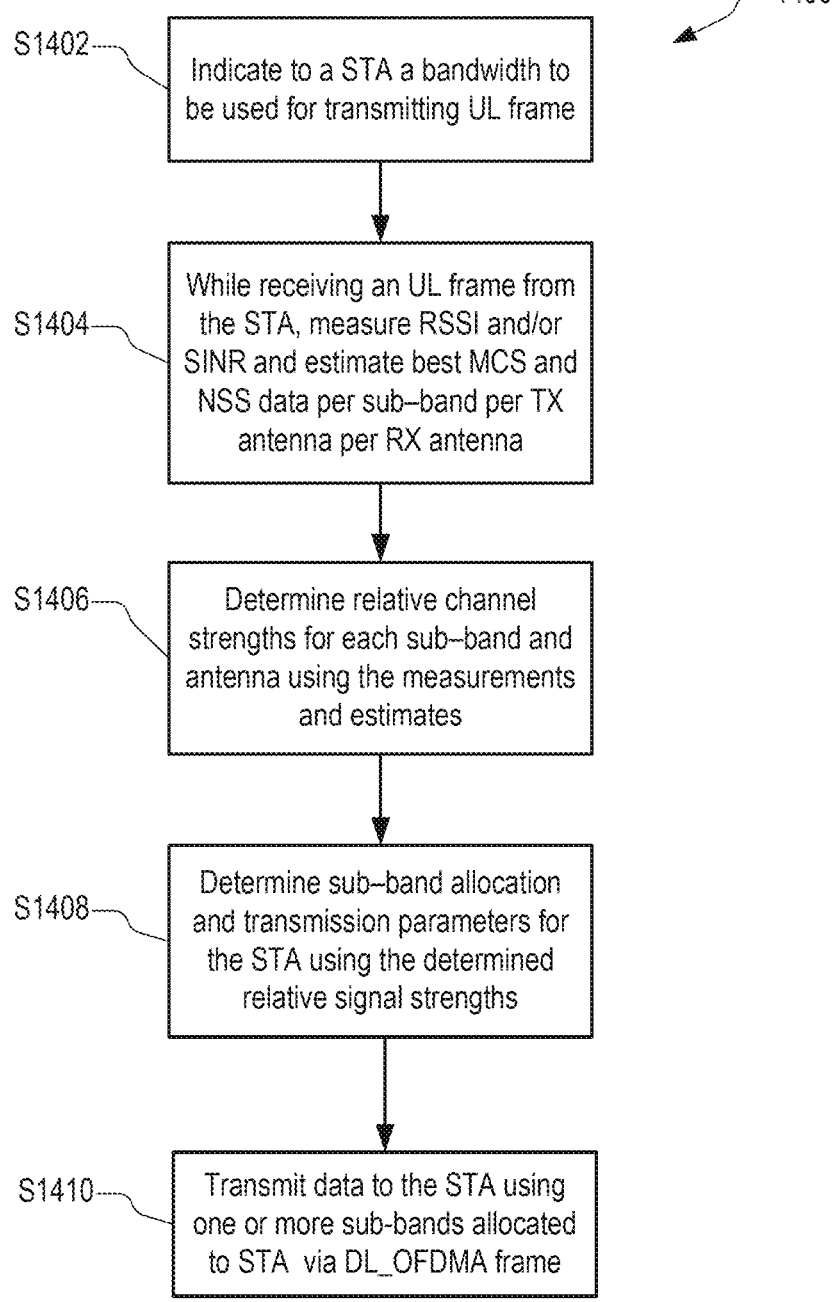
FIG. 14 illustrates a process for transmitting data using one or more sub-bands or resource units in an access point according to an embodiment.

FIG. 14 illustrates a process 1400 of determining OFDMA CSI by an Access Point (AP) according to an embodiment. The process 1400 may be employed in a system using one or more of the processes 700, 700', 700", 1000, and 1300 of respective FIGS. 7A, 7B, 7C, 11, and 14.

At S1402, the AP may implicitly or explicitly indicate to a station STA that the station STA is to use a particular bandwidth to transmit an uplink (UL) frame. For example, the AP may transmit to the station STA a frame that indicates a specified bandwidth that is relatively wide (e.g., bandwidth greater than 20 MHz) is to be used or that indicates that the widest allowed bandwidth respectively available between the station STA and the AP is to be used.

In an embodiment, in order to provide an explicit indication, the AP may transmit a downlink (DL) frame that may include a field (e.g., the Wideband BA Response subfield as described above) that directs the one or more STAs to transmit one or more respective UL frames using the respective widest allowed bandwidth.

In an embodiment, an implicit indication may be provided by the AP by, for example, transmitting a DL frame in a particular format. For example, a DL frame, such as a DL control frame, that is typically transmitted with a bandwidth of 20 MHz may instead be transmitted with a bandwidth that is greater than 20 MHz. When a STA detects the wider bandwidth of the received DL frame, the STA may determine to transmit an uplink frame using a widest allowed bandwidth, which in some cases, may be a bandwidth that mirrors the bandwidth of the received DL frame.

In another embodiment where the STA does not need to be prompted by the AP to transmit UL frames that support implicit OFDMA sub-band sounding (such as the PS-polling sounding implementations described above), the AP does not implicitly or explicitly indicate the bandwidth (e.g., widest allowable bandwidth) to be used for transmitting a subsequent UL frame. That is, in some embodiments, S1402, as well as one or more of the other operations illustrated in FIG. 14, may not be implemented.

At S1404, the AP receives an UL frame suitable for use in performing implicit OFDMA sub-band sounding (such as, for examples, one of the frames illustrated in FIGS. 3, 8, and 11) from a station. The received UL frame is a frame transmitted by the station at a maximum allowed bandwidth. In an embodiment, the received UL frame having a bandwidth that is greater than 20 MHz. For example, the received UL frame may have a bandwidth of any of 40 MHz, 80 MHz, 160 MHz, and 80+80 MHz. The UL frame may be any one of a PS-polling frame, an ACK frame, a BA frame, and the like.

While receiving the UL frame, the AP may perform one or more of a RS SI measurement, a SSINR measurement, an estimate of a best MCS, and an estimate of a best NSS for each sub-band of the maximum allowed bandwidth or for each combination of the sub-band and a transmitting antenna, a receiving antenna, or both. In an embodiment, measurements of various characteristics for each of a plurality of subcarriers of each sub-band may be combined to determine respective measurements for each sub band.

The measurements for each sub-band may be taken for each of a plurality of transmitting antennas when the UL frame is transmitted using the plurality of transmitting antennas. The measurements for each sub-band may be taken for each of a plurality of receiving antennas when the UL frame is received using the plurality of receiving antennas. The measurements for each sub-band may be taken for each combination of a transmitting antenna and a receiving antenna when the UL frame is transmitted using the plurality of transmitting antennas and received using the plurality of receiving antennas.

At S1406, the AP determines relative sub-band strengths for the station for each sub-band or for each sub-band/antenna combination using one or more of the measured RSSI, the measured SINR, the estimated best MCS, and the estimated best NSS. In an embodiment, the channel strength measures for each measured sub-band are determined for one or more of each transmitting antenna, each receiving antenna, and each combination of a transmitting antenna and a receiving antenna.

Determining the channel strength measures for each measured sub-band may include computing a metric using one or more of an RSSI, an SINR, an MCS, and an NSS. The metric may be normalized to provide relative channel information between the measured sub-bands.

In an embodiment, computing an RSSI, an SINR, or both of a sub-band may include computing an average of RSSIs or SINRs, respectively, of the subcarriers that belong to the sub-band. In an embodiment, computing an MCS of a sub-band may include computing a highest bit rate MCS that meets a Packet Error Rate (PER) requirement. In an embodiment, computing an NSS of a sub-band may include computing a highest NSS that meets the PER requirement.

At S1408, the AP determines allocations of one or more sub-bands to the station and transmission parameters for an OFDMA DL frame to be sent to the station according to the relative subband strengths for the station and the measured data. In an embodiment, the AP allocates a sub-band in the OFDMA DL frame to the station when a relative sub-band strength of the sub-band for the station is higher than a relative sub-band strength of the sub-band for one or more other stations.

At S1410, the AP transmits data to the STA using one or more sub-bands or RUs allocated to STA. In particular, the data may be transmitted in the one or more allocated sub-bands or RUs of a DL_OFDMA frame to be transmitted to the STA as well as to other STAs.

In above explanations and figures, illustrative embodiments were provided to allow a person of ordinary skill in the art to understand and implement embodiments of the disclosure. However, embodiments are not limited thereto, and are therefore not limited to the number of STAs, specific identifications, specific formats, specific number of STAs per identifications, or other specifics of the illustrative embodiments. Furthermore, while in the description and related figures the reference has made to one or more IEEE Std 802.11 standards, the design is not limited to 802.11, and a person of ordinary skill in the art in light of the teachings and disclosures herein would understand how the present disclosures apply to any next-generation wireless operation that operates in licensed or unlicensed bands.

Embodiments of the present disclosure include electronic devices configured to perform one or more of the operations described herein, which include operations for generating, decoding, or both, the frames described herein. The electronic devices may include wireless devices such as wireless device 200 shown in FIG. 2, including the AP 103 and stations 104 to 114 illustrated in FIG. 1. However, embodiments are not limited thereto.

Embodiments of the present disclosure may further include systems configured to operate using the processes and frames described herein. The systems may include basic service sets (BSSs) such as the BSS 100 of FIG. 1, but embodiments are not limited thereto.

Embodiments of the present disclosure may be implemented in the form of program instructions executable through various computer means and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless device 200 of FIG. 2.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD_ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. Further, two or more embodiments may be combined.

What is claimed is:

1. A method for communication in a wireless local area network, the method comprising:
receiving, at a first device, a control frame using a plurality of sub bands of a widest allowable bandwidth from a second device, the control frame having a bandwidth greater than 20 MHz;
determining, by the first device using one or more of a Received Signal Strength Indication (RSSI) determined by the first device using the control frame, a Signal to Interference and Noise Ratio (SINR) determined by the first device using the control frame, a Modulation and Coding Scheme (MC S) of the control frame, and a Number of Spatial Streams (NSS) of the control frame, a channel state information (CSI) for each of a plurality of sub bands of a bandwidth of the control frame; and
allocating, by the first device to the second device, one or more sub bands from the plurality of sub bands based on the CSI,
wherein the widest allowable bandwidth is determined according to whether one or more of a secondary 80 MHz channel, a secondary 40 MHz channel, and a secondary 20 MHz channel is sensed busy during a Point coordination function InterFrame Space (PIFS) before transmission of the control frame,
wherein when both the first and second device may communicate using a 160 MHz bandwidth, the widest allowable bandwidth is 80 MHz when the secondary 80 MHz channel is sensed busy, and
wherein when both the first and second device may communicate using, an 80 MHz or greater bandwidth, the widest allowable bandwidth is 40 MHz when the secondary 40 MHz channel is sensed busy.

2. The method of claim 1, further comprising:
transmitting, from the first device to the second device before receiving the control frame, an indication that the first device permits transmission by the second device of the control frame using the widest allowable bandwidth.

3. The method of claim 1, further comprising:
receiving, by the first device from the second device before receiving the control frame, an indication that the second device supports transmission of control frames using a bandwidth greater than 20 MHz.

4. The method of claim 3, further comprising:
receiving, by the first device from the second device before receiving the control frame, an indication that the second device supports transmission of control frames using a bandwidth greater than 40 MHz.

5. The method of claim 1, wherein the control frame is a Power Save (PS) Poll frame.

6. The method of claim 1, wherein receiving the control frame includes receiving the control frame in a Non-High Throughput (Non-HT) duplicate format.

7. A method for communication in a wireless local area network, the method comprising:
determining, by a first device, a widest allowable bandwidth; and
transmitting, by the first device to a second device, a control frame using a plurality of sub bands of the widest allowable bandwidth to a second device, the control frame having a bandwidth greater than 20 MHz;
wherein determining the widest allowable bandwidth comprises:
determining a current maximum operating bandwidth,
producing, during a Point coordination function InterFrame Space (PIFS) before transmission of the control frame, one or more of a determination of whether a secondary 80 MHz channel is sensed busy, a determination of whether a secondary 40 MHz channel is sensed busy, and a determination of whether a secondary 20 MHz channel is sensed busy,
when the current maximum operating bandwidth is greater than 80 MHz, determining the widest allowable bandwidth is 80 MHz when the secondary 80 MHz channel is sensed busy, and
when the current maximum operating bandwidth is greater than 40 MHz, determining the widest allowable bandwidth is 40 MHZ when the secondary 40 MHz channel is sensed busy.

8. The method of claim 7, further comprising:
receiving, by the first device from the second device before transmitting the control frame, an indication that the second device permits transmission by the first device of the control frame using the widest allowable bandwidth.

9. The method of claim 7, further comprising:
transmitting, by the first device to the second device before transmitting the control frame, an indication that the first device supports transmission of control frames using a bandwidth greater than 20 MHz.

10. The method of claim 9, further comprising:
transmitting, by the first device to the second device before transmitting the control frame, an indication that the second device supports transmission of control frames using a bandwidth greater than 40 MHz.

11. The method of claim 7, wherein the control frame is a Power Save (PS) Poll frame.

12. The method of claim 7, wherein transmitting the control frame includes transmitting the control frame in a Non-High Throughput (Non-HT) duplicate format.

13. The method of claim 7, wherein determining the current maximum operating bandwidth comprises:
determining a current operational bandwidth of the first device;
determining a current operational bandwidth of the second device; and
determining the current maximum operating bandwidth according to the lesser of the current operational bandwidth of the first device and the current operational bandwidth of the second device.

14. A wireless device, the wireless device comprising:
a receiver;
a transmitter; and
a processor, the processor configured to perform:
determining, using the receiver, a widest allowable bandwidth; and
transmitting, using the transmitter, a control frame using a plurality of sub bands of the widest allowable bandwidth to another device, the control frame having a bandwidth greater than 20 MHz,
wherein determining the widest allowable bandwidth comprises:
determining a current maximum operating bandwidth,
producing, during a Point coordination function InterFrame Space (PIFS) before transmission of the control frame and using the receiver, one or more of a determination of whether a secondary 80 MHz channel is sensed busy, a determination of whether a secondary 40 MHz channel is sensed busy, and a determination of whether a secondary 20 MHz channel is sensed busy,
when the current maximum operating bandwidth is greater than 80 MHz, determining the widest allowable bandwidth is 80 MHz when the secondary 80 MHz channel is sensed busy, and
when the current maximum operating bandwidth is greater than 40 MHz, determining the widest allowable bandwidth is 40 MHz when the secondary 40 MHz channel is sensed busy.

15. The wireless device of claim 14, further comprising:
receiving, by the wireless device from the other device before transmitting the control frame, an indication that the other device permits transmission by the wireless device of the control frame using the widest allowable bandwidth.

16. The wireless device of claim 14, further comprising:
transmitting, by the wireless device to the other device before transmitting the control frame, an indication that the wireless device supports transmission of control frames using a bandwidth greater than 20 MHz.

17. The wireless device of claim 16, further comprising:
transmitting, by the wireless device to the other device before transmitting the control frame, an indication that the wireless device supports transmission of control frames using a bandwidth greater than 40 MHz.

18. The wireless device of claim 14, wherein the control frame is a Power Save (PS) Poll frame.

19. The wireless device of claim 14, wherein transmitting the control frame includes transmitting the control frame in a Non-High Throughput (Non-HT) duplicate format.

20. The wireless device of claim 14, wherein determining the current maximum operating bandwidth comprises:
determining a current operational bandwidth of the wireless device;
determining a current operational bandwidth of the other device; and
determining the current maximum operating bandwidth according to the lesser of the current operational bandwidth of the wireless device and the current operational bandwidth of the other device.

* * * * *